(12) United States Patent
Tamaizumi

(10) Patent No.: US 7,990,094 B2
(45) Date of Patent: Aug. 2, 2011

(54) MOTOR CONTROLLER AND ELECTRIC POWER STEERING APPARATUS

(75) Inventor: Terutaka Tamaizumi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 557 days.

(21) Appl. No.: 12/142,376

(22) Filed: Jun. 19, 2008

(65) Prior Publication Data

US 2008/0315809 A1    Dec. 25, 2008

(30) Foreign Application Priority Data

Jun. 20, 2007 (JP) ................. 2007-162985
Nov. 19, 2007 (JP) ................. 2007-299476

(51) Int. Cl.
*H02P 1/04* (2006.01)
(52) U.S. Cl. .................. 318/461; 318/400.02
(58) Field of Classification Search .......... 318/461, 318/798, 806, 432, 434, 400.02
See application file for complete search history.

(56) References Cited

U.S. PATENT DOCUMENTS

| | | | | |
|---|---|---|---|---|
| 4,251,846 A * | 2/1981 | Pearson et al. | ............... | 361/30 |
| 6,037,741 A * | 3/2000 | Yamada et al. | ............... | 318/721 |
| 6,297,574 B1 * | 10/2001 | Schob et al. | ............... | 310/90.5 |
| 6,504,336 B2 * | 1/2003 | Sakamaki | ............... | 318/727 |
| 7,782,000 B2 * | 8/2010 | Suzuki | ............... | 318/434 |
| 7,813,089 B2 * | 10/2010 | Suzuki | ............... | 361/31 |
| 7,880,417 B2 * | 2/2011 | Suzuki | ............... | 318/432 |

FOREIGN PATENT DOCUMENTS

EP    1 737 116 A1    12/2006
JP    2003-026020    1/2003

OTHER PUBLICATIONS

U.S. Appl. No. 12/273,881, filed Nov. 19, 2008, Tamaizumi.
U.S. Appl. No. 12/354,401, filed Jan. 15, 2009, Nozawa.
U.S. Appl. No. 12/355,118, filed Jan. 16, 2009, Nozawa, et al.
U.S. Appl. No. 12/435,046, filed May 4, 2009, Tamaizumi, et al.

* cited by examiner

*Primary Examiner* — Rina I Dada
(74) *Attorney, Agent, or Firm* — Oblon, Spivak, McClelland, Maier & Neustadt, L.L.P.

(57) ABSTRACT

The micro computer 17 continue an output of a motor control signal to execute a current control to carry to each of two phases a phase current changing like a secant curve or a cosecant curve at making a predetermined rotational angle according to the phase generated the current-carrying failure as an asymptote at the generation of the current-carrying failure. The micro computer 17 provides a rotational angle compensating section 40 compensating an input rotational angle $\theta$ to correct a phase offset between a phase current command value Ix* as a current command value and an actual phase current value Ix as an actual current value in the current control.

6 Claims, 24 Drawing Sheets

MOTOR CONTROLLER AND ELECTRIC POWER STEERING APPARATUS

INCORPORATION BY REFERENCE

The present application claims priority under 35 U.S.C. §119 to Japanese Patent Applications No. 2007-162985, filed on Jun. 20, 2007 and No. 2007-299476, filed on Nov. 19, 2007. The contents of the applications are incorporated herein by reference in their entirety.

BACKGROUND OF THE INVENTION

1. Field of the Invention

The present invention relates to a motor controller and an electric power steering apparatus provided with the motor controller.

2. Description of the Prior Art

It is well known for a motor controller of an electric power steering apparatus (EPS) to stop a controller controlling its motor immediately after abnormal state is detected. The abnormal state is a current-carrying failure in any phase of U, V, W of the motor by a wire breaking of a power supplying line and a terminal failure of a driving circuit. Therefore, the motor controller is provided with an abnormal detecting member to detect a generation of the current-carrying failure and to stop the motor control for a fail safe immediately after the detection of the abnormal generation.

However, there is a problem for the conventional EPS to change extremely its steering performance by the stop of the motor control. Therefore, a driver of a vehicle is required larger steering force for a steady steering operation. In this point, there is a conventional motor controller as disclosed in a Japanese unexamined published patent document 2003-26020 (Tokkai 2003-26020) to continue the motor control by carrying the current into other remaining two phases than the phase of the current-carrying failure. Thereby, the conventional motor controller can keep exerting an assist force to a steering system to prevent increasing of a load to the driver by the fail safe.

However, the conventional motor controller tends to make a worse steering feeling due to a generation of a torque ripple because of the construction to carry the current like a sine wave in a V phase and a W phase (the current-carrying failure in a U phase) of the current-carrying phases as shown in FIG. 1.

In the conventional motor controller as shown in FIG. 2, where a transition of the motor current at the two phases driving is shown by a d/q coordinate system, even though a q-axis current command value as a target control value of the motor torque is constant, an actual q-axis current value, however, varies like the sine curve. As a result, the motor current corresponding to a required torque does not appear so that the motor driving is continued without its original performance.

SUMMARY OF THE INVENTION

In view of the previously mentioned circumstances, it is an object of the present invention to provide a motor controller or an electric power steering apparatus provided with the motor controller to make a smooth rotation of a motor at two phases driving where a phase of a current-carrying failure is generated and to achieve a high output performance.

In order to achieve the above and other objects, one aspect of the present invention provides a motor controller or an electric power steering apparatus provided with the motor controller mainly having a motor control signal output member executing a current control to carry to each of two phases a phase current changing like a secant curve or a cosecant curve at making a predetermined rotational angle according to a phase generated a current-carrying failure as an asymptote at said generation of the current-carrying failure, and compensating the rotational angle to correct a phase offset between a current command value and an actual current value in the current control.

Based on the above construction, the motor current can be generated corresponding to a demand torque except for the predetermined rotational angle corresponding to the asymptote, or except for a current limit range adjacent to the predetermined rotational angle where there is an limitation on a phase current value carried the current in each phase of the motor. Thereby, there is no generation of a larger torque ripple to keep a high output performance with a continuation of the motor driving. By the correction of the phase offset between a current command value and an actual current value in the two phases driving, the present invention can reduce the range where there is an un-coincidence between a mark of the current command value and a mark of an actual current value generated adjacent to the predetermined rotational angle when the rotational angle of the motor passes the predetermined rotational angle corresponding to the asymptote, restraining a generation of the current rotating a reversal direction of the motor. Therefore, the phase offset between the current command value and the actual current value in the current control can be corrected to restrain the generation of the reversal assist so that the motor can be rotated smoothly without any sticking.

Second aspect of the present invention provides a motor controller or an electric power steering apparatus provided with the motor controller mainly having a motor control signal output member compensating the rotational angle to an advanced direction according to a rotational direction of the motor. There is any tendency that a phase angle of the actual current carried to the motor is delayed to a phase angle of the current command value because there are mechanical factor such as a back-lash in the motor, a delay of the calculation or a phase angle delay of the current control and so on. However, present invention constructed above can correct the phase delay of the actual current value to the current command value by advancing the rotation in advanced direction according to the rotational direction, thereby to achieve the smooth rotation of the motor.

Third aspect of the present invention provides a motor controller or an electric power steering apparatus provided with the motor controller mainly having a motor control signal output member compensating a rotational angle in a way that the faster a rotational angle velocity of the motor is, the larger a compensating amount of the rotational angle in the advanced direction is. There is any tendency that a delay of the phase angle of the actual current value to the phase angle of the command current value is happened more remarkably in accordance with the faster rotational angle velocity of the motor. Therefore, the present invention constructed above can accurately correct the delay of the phase angle of the actual current value to the phase angle of the command current value.

Fourth aspect of the present invention provides a motor controller or an electric power steering apparatus provided with the motor controller mainly having a current feedback control as the current control at the phase generated the current-carrying failure. It is pointed out that the most affective factor of an element of a time delay is the phase delay in the current feedback control. Therefore, the present invention constructed above can achieve more remarkable effects by the current feedback control executing the output of the motor control signal at the generation of the current-carrying failure.

Fifth aspect of the present invention provides a motor controller or an electric power steering apparatus provided with the motor controller mainly having a motor control signal output member executing said current feedback control in a d/q coordinate system without said generation of said current-carrying failure, and a phase current feedback control at said generation of said current-carrying failure. There is any tendency that the phase delay in a phase current feedback control is larger than that in a current feedback control of a d/q coordinate system. Therefore, the present invention constructed above can achieve more remarkable effects by the phase current feedback control executing the output of the motor control signal at the two phases driving.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Embodiments of the motor controller and the electric power steering apparatus (EPS according to the present invention will be described hereinafter referring to FIGS. 3 to 24.

Figure 1:
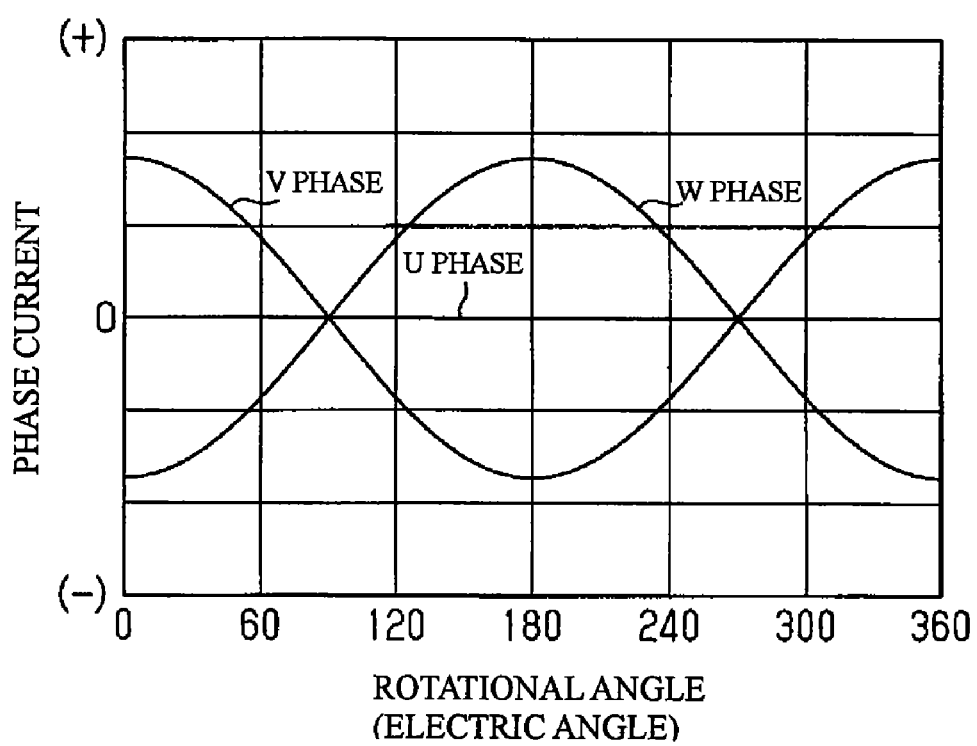
FIG. 1 is an explanatory diagram showing the state of the two phase driving where the two phases other than the phase generated the current-carrying failure are the current-carrying in the prior art.
Figure 2:
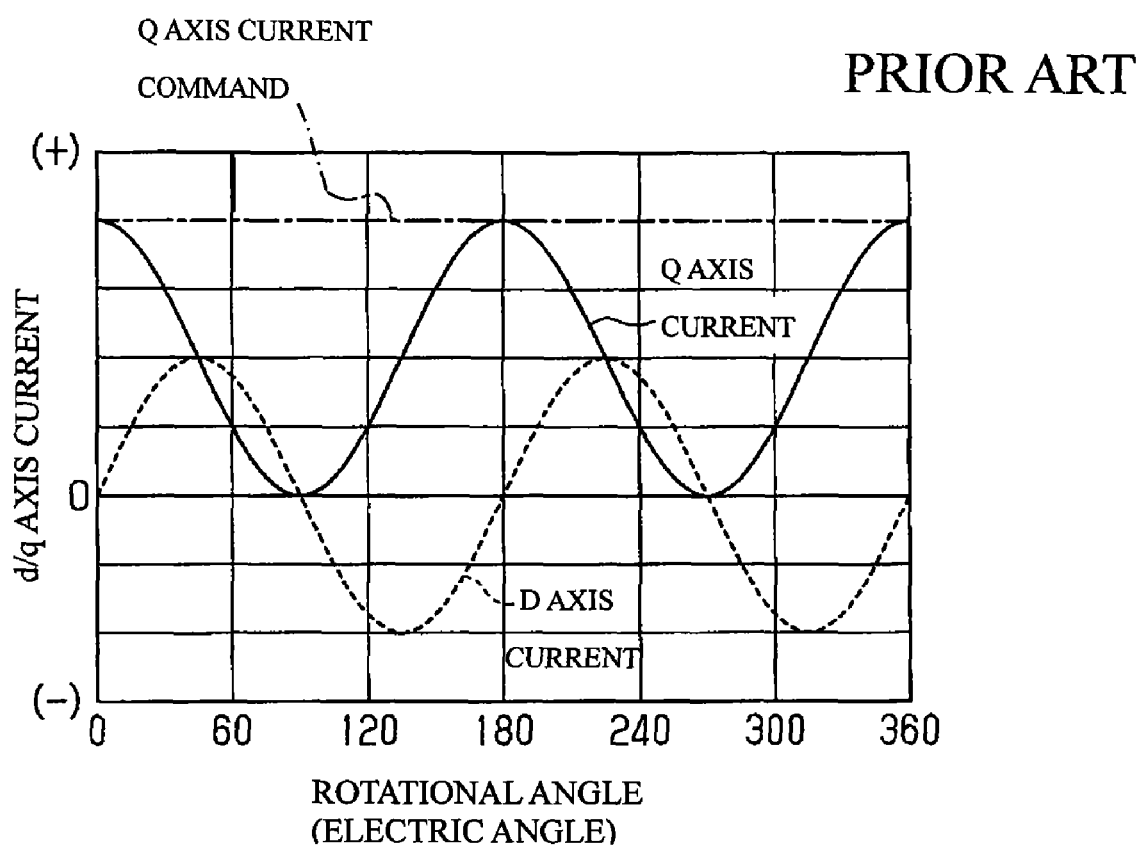
FIG. 2 is an explanatory diagram showing the transitions of the d-axis current and the q-axis current.
Figure 3:
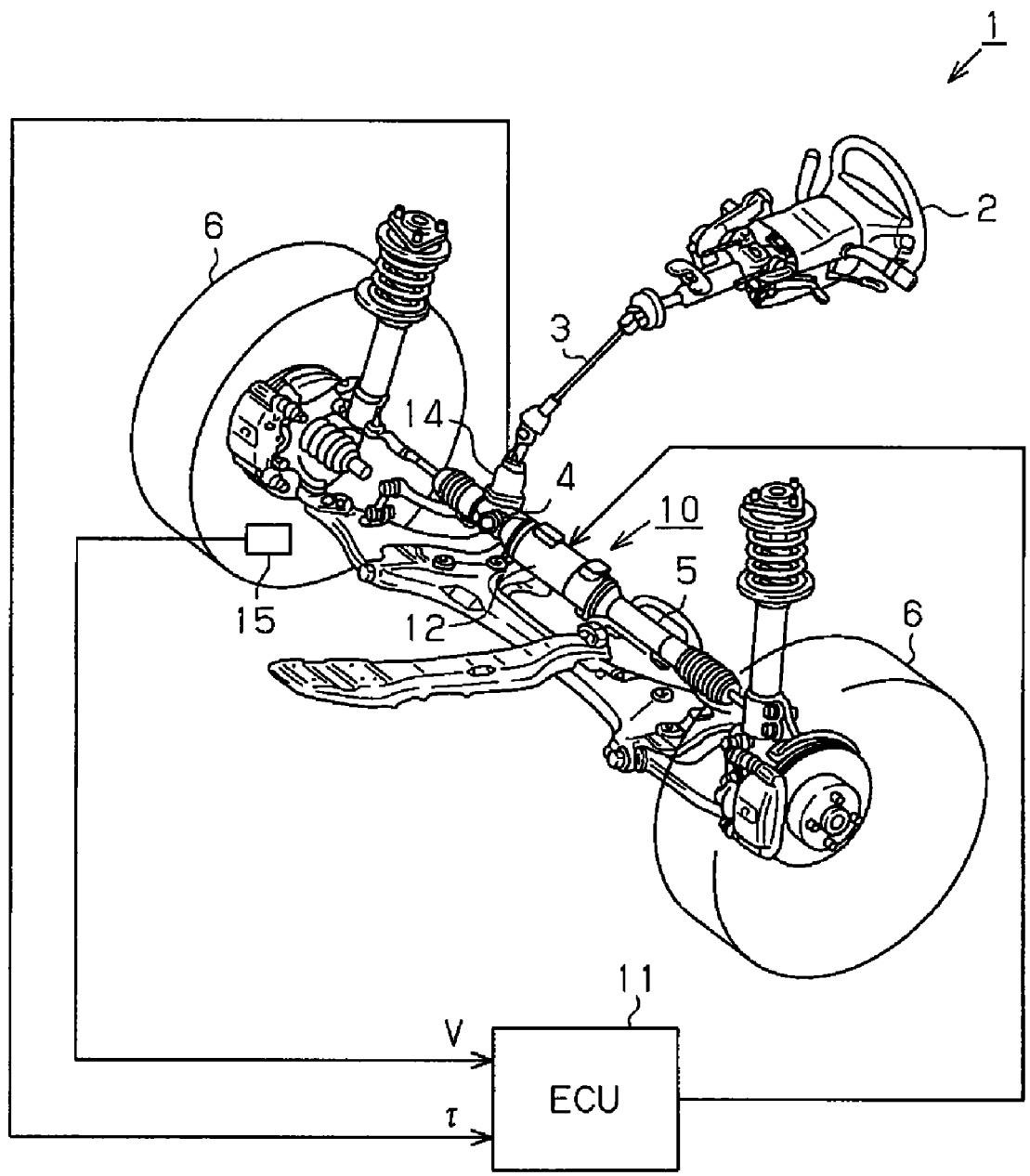
FIG. 3 is a schematic construction diagram of an electric power steering apparatus (EPS) according to one embodiment of the present invention.

FIG. 3 is a schematic diagram of the EPS 1 of one embodiment of the present invention. A steering wheel 2 is fixed to steering shaft 3 connecting to a rack 5 through a rack and pinion mechanism 4. A rotation of the steering shaft 3 according to a steering operation is transformed to a reciprocating movement of the rack 5 by the rack and pinion mechanism 4. Finally, the reciprocating movement of the rack 5 changes a steering angle of the steered wheels 6.

The EPS 1 includes an EPS actuator 10 and an ECU 11. The EPS actuator 10 is a steering force assisting device to exert an assisting force for assisting the steering operation of a steering system. The ECU 11 is controller to control the operation of the EPS actuator 10.

The EPS actuator 10 of the one embodiment is a so called rack assisted EPS actuator in which a motor 12 as driving source is disposed in concentrically with the rack 5. Assisting torque generated by the motor 12 is transmitted to the rack 5 through an un-illustrated ball screw mechanism. Besides, the motor 12 in the one embodiment is a brushless motor and is rotated by receiving driving power of three phases of U, V and W from the ECU 11. And the ECU 11 as the motor controller controls the assisting torque generated by the motor 12 to control assisting force exerted on the steering system, that is called as a power assisting control.

The ECU 11 is connected to a torque sensor 14 and a speed sensor 15 in the one embodiment. The ECU 11 achieves the operation of the EPS actuator 10, that is the power assisting control, based on a steering torque τ detected by the torque sensor 14 and a vehicle speed V detected by the speed sensor 15.

Next, an electric construction of the EPS of the one embodiment of the present invention will be explained hereinafter.

Figure 4:
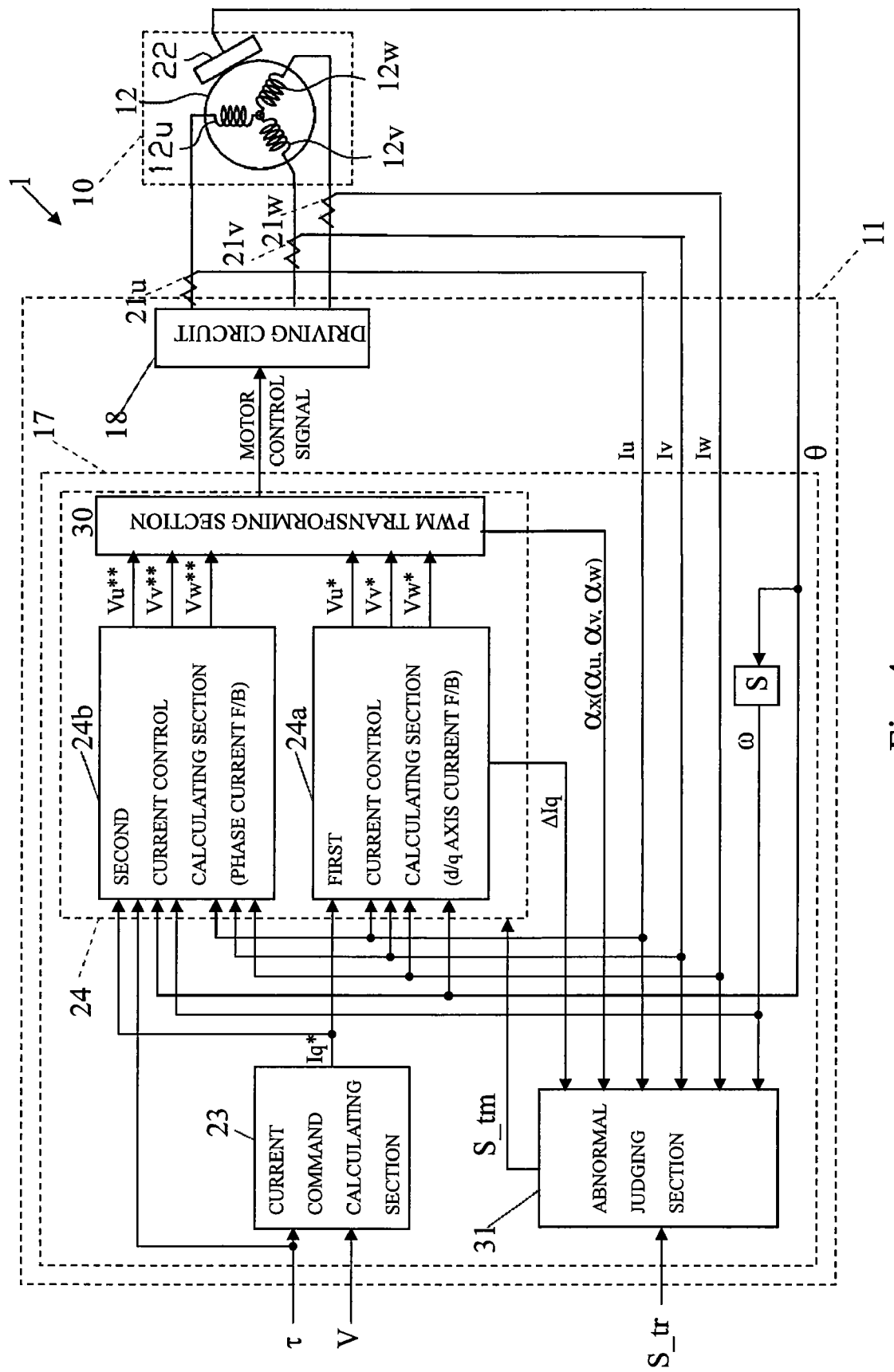
FIG. 4 is a block diagram showing the electric construction of the EPS.

FIG. 4 is a control block diagram of the EPS of the one embodiment. The ECU 11 includes a micro computer 17 and a driving circuit 18. The micro computer 17 is a motor control signal output member of the present invention to output a motor control signal. The driving circuit 18 supplies the driving power of three phases to the motor 12 based on the motor control signal.

Besides, the driving circuit 18 of the one embodiment is a well known PWM inverter connecting three arms corresponding to each phase in parallel. Each of three arms is consisted of a basic unit (as the arm) of a pair of switching elements each of which are connected in serial. The motor control signal output from the micro computer 17 is constructed to define an on-duty ratio of each of the switching elements. The motor control signal is charged on a gate terminal of each of the switching elements to change the switching elements in on-state or off-state in accordance with the motor control signal so that a DC voltage is changed to the driving power of three phases U, V, W to be charged on the motor 12.

In this embodiment, the ECU 11 is connected to current sensors 21u, 21v, 21w and a rotational angle sensor 22. The current sensors 21u, 21v, 21w detect each of phase current values Iu, Iv, Iw carried to the motor 12. The rotational angle sensor 22 detects a rotational angle θ, that is an electric angle, of the motor 12. The micro computer 17 outputs the motor control signal to the driving circuit 18 based on each phase current value Iu, Iv, Iw and the rotational angle θ of the motor 12, the steering torque τ and the vehicle speed V.

In detail, the micro computer 17 of the one embodiment decides assisting force, that is target assisting force, exerted to the steering system based on the steering torque τ and the vehicle speed V to practice the current control based on the detected phase current value Iu, Iv, Iw and the detected rotational angle θ in order to generate the assisting force on the motor 12, so that the motor control signal is generated.

The micro computer 17 includes a current command calculating section 23 and a motor control signal generating section 24. The current command calculating section 23 is a current command calculating member of the present invention calculating a value of current command as a controlled target of the motor torque. The motor control signal generating section 24 is a motor control signal generating member of the present invention generating the motor control signal based on the a value of the current command calculated by the current command calculating section 23.

The current command calculating section 23 calculates a q-axis current command value Iq* of a d/q coordinate system based on the steering torque τ detected by the torque sensor 14 and the vehicle speed V detected by the vehicle speed sensor 15 and outputs the q-axis current command value Iq* to the motor control signal generating section 24. The q-axis current command value Iq* is a current command correspondent to the target control value of the motor torque. On the other hand, to the motor control signal generating section 24 are input not only the q-axis current command value Iq* output from the current command calculating section 23 but also the phase current values Iu, Iv, Iw detected by each of current sensors 21u, 21v, 21w and the rotational angle θ detected by the rotational angle sensor 22. The motor control signal generating section 24 executes the current feedback control in the d/q coordinate system to generate the motor control signal based on the phase current values Iu, Iv, Iw and the rotational angle θ.

In detail further, the motor control signal generating section 24 of the one embodiment includes a first current control section 24a calculating phase voltage command values Vu*, Vv*, Vw* of three phases by executing the current feedback control (a d/q axis current F/B) in the d/q coordinate system. The motor control signal is generated based on each phase voltage command values Vu*, Vv*, Vw* calculated by the first current control section 24a in a normal state.

Figure 5:
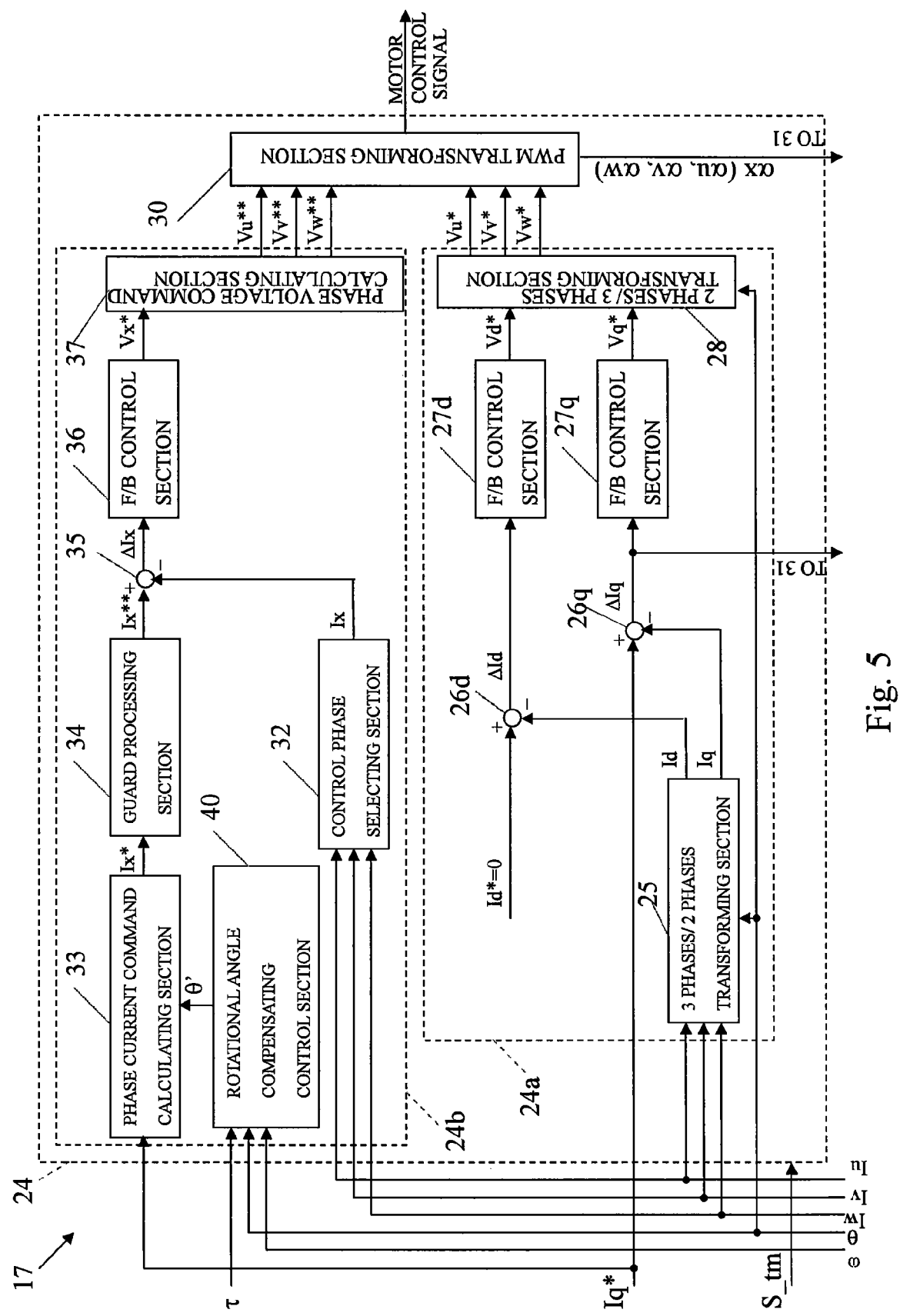
FIG. 5 is a control block diagram of a motor control signal generating section of a micro computer.

As shown in FIG. 5, each of phase current values Iu, Iv, Iw input into the first current control section 24a is further input into a three phases/two phases transforming section 25 with the rotational angle θ to be transformed to a d-axis current value Id and a q-axis current value Iq of the d/q coordinate system by the three phases/two phases transforming section 25. The q-axis current value Iq is input into a subtracting circuit 26q with a q-axis current command value Iq* input from the current command calculating section 23, and the d-axis current value Id is input into a subtracting circuit 26d with a d-axis current command value Id* where the d-axis current command value Id* equals to zero (Id*=0).

Each of the subtracting circuits 26d, 26q calculating each of a d-axis current deviation ΔId and a q-axis current deviation ΔIq to be input into a corresponding P/B control sections 27d, 27q. These F/B control section 27d, 27q control in a feed back way in order that each of the actual d-axis current value Id and the actual q-axis current value Iq follow with each of the d-axis current command value Id* and the q-axis current command value Iq* respectively output from the current command calculating section 23.

In other word, the F/B control sections 27d, 27q calculate the d-axis current command value Vd* and the q-axis voltage command value Vq* by multiplying the d-axis current deviation ΔId and the q-axis current deviation ΔIq respectively with each predetermined F/B gain, that is a PI gain. These calculated d-axis voltage command value Vd* and the calculated q-axis voltage command value Vq* are input into a two phases/three phases transforming section 28 with the rotational angle θ to be transformed to phase voltage command values Vu*, Vv*, Vw* of three phases in the two phases/three phases transforming section 28. Then, the first current control section 24a output the transformed phase voltage command values Vu*, Vv*, Vw* to the PWM transforming section 30.

The PWM transforming section 30 generates duty command values αu, αv, αw according to each of input phase voltage command values Vu*, Vv*, Vw* and generates a motor control signal having the on-duty ratio represented in the duty command values αu, αv, αw. As shown in FIG. 4, the micro computer 17 output the generated motor control signal by the motor control signal generating section 24 to each of gate terminals of switching elements consisted of the driving circuit 18 to control the operation of the driving circuit 18, that is to control supplies of driving power to the motor 12.

[Control Operation in Generation of Abnormal State]

As shown in FIG. 4, in the ECU 11 of the one embodiment, the micro computer 17 includes an abnormal judging section 31 identifying any abnormal state where the abnormal state is happen in the EPS 1. The micro computer 17 of the ECU 11 changes a control mode of the motor 12 in accordance with the abnormal state identified or judged by the abnormal judging section 31.

In detail, the abnormal judging section 31 is input an abnormal signal S_tr detecting the abnormal state in a machine system of the EPS actuator 10 to detect the abnormal state of the machine system in the EPS 1 based on the abnormal signal S_tr. Into the abnormal judging section 31 are input each detected phase current values Iu, Iv, Iw, a rotational angle velocity ω, the duty command vales αu, αv, αw, the q-axis current deviation ΔIq calculated in the first current control section 24a of the motor control signal generating section 24, and so on. The abnormal judging section 31 detect the generation of the abnormal state in the control system.

In the concrete, the abnormal judging section 31 in the one embodiment observes the q-axis current deviation ΔIq in order to detect the generation of the abnormal state about all phenomenon in the control system, for example the abnormal state in the torque sensor 14, in the driving circuit 18 etc. It is judged the generation of the abnormal state in the control system where the value of the q-axis current deviation ΔIq is over the predetermined threshold value in the predetermined range by comparing the value of the q-axis current deviation ΔIq with the predetermined threshold value in a predetermined time interval.

The abnormal judging section 31 detects also the generation of a phase of the current-carrying failure caused by a breaking of wire in a power line including a motor coil, a terminal failure in the driving circuit 18 etc. on the basis of each phase current values Iu, Iv, Iw, the rotational angle velocity ω, each duty command vales αu, αv, αw. The detection of the generated phase of the current-carrying failure is determined whether it is continued or not for the state that a duty command value αx of a X phase (X=U, V, W) is out of a predetermined range (αLo≦αx≦αHi) corresponding to a predetermined value Ith and a threshold value ωo restricting the judged target range where the phase current value Ix of the X phase is equal or less than a predetermined value Ith (|Ix|≦Ith) and the rotational angle velocity ω is within a target range of the judgment of the breaking of wire (|ω|≦ωo).

Besides, in this case, the predetermined value Ith, that is the threshold value of the phase current values Ix is set to around zero, and the threshold value ωo of the rotational angle velocity ω is set to a value corresponding to a maximum rotational number of the motor. Threshold values αLo, αHi relating to the duty command value αx is respectively set smaller than a lower limit which is possible minimum value of the duty command value αx and larger than a upper limit which is possible maximum value of the duty command value αx in the normal control.

Figure 6:
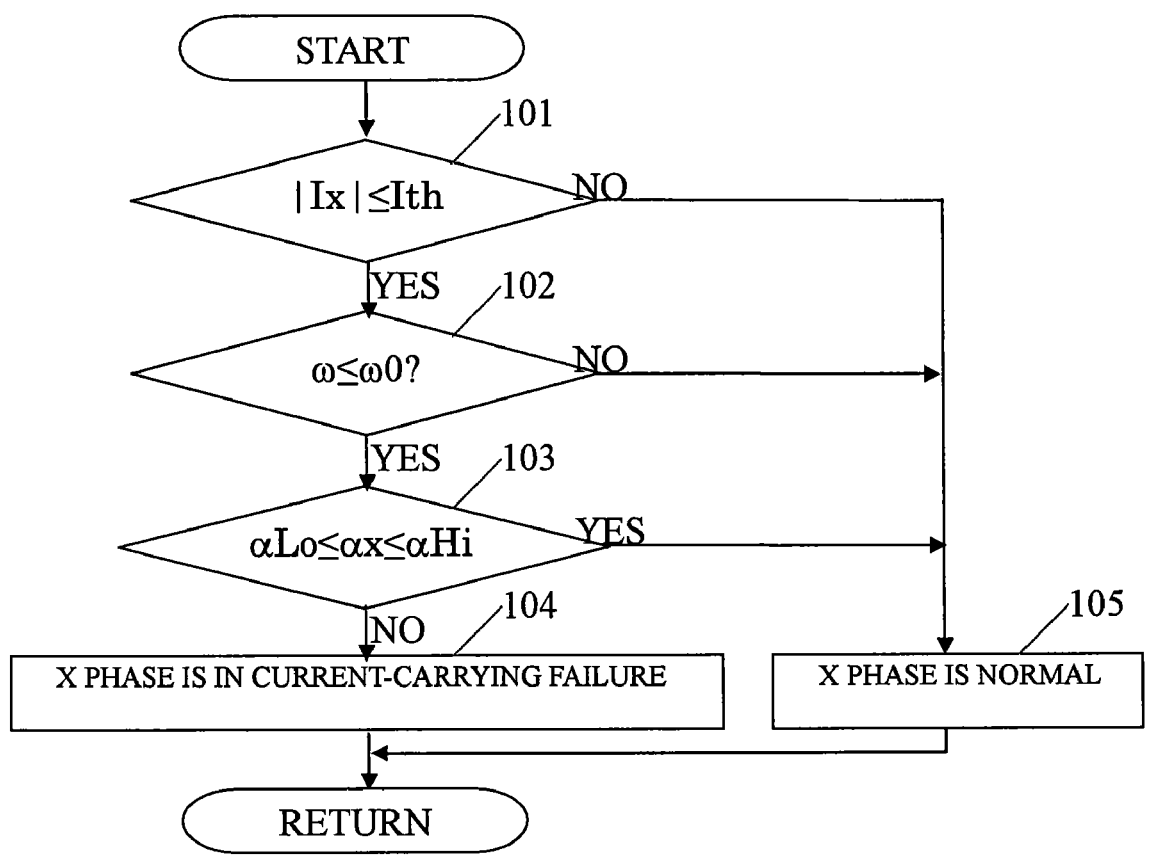
FIG. 6 is a flow chart showing processing steps of detecting the phase of the current-carrying failure.

As shown in a flow chart of FIG. 6, the abnormal judging section 31 judges whether an absolute value of the detected phase current value Ix is equal or lower than the predetermined value Ith at a Step 101. Where the absolute value is equal or lower than the predetermined value Ith (|Ix|≦Ith, that is the answer in Step 101 is YES), then it judges whether the rotational angle velocity ω is equal or lower than the predetermined threshold value ωo in Step 102. And where the rotational angle velocity ω is equal or lower than the predetermined threshold value ωo (|ω|≦ωo, Step 2: YES), it judges whether the duty command value αx is within the above identified range (αLo≦αx≦αHi) in Step 103. Finally, the abnormal judging section 31 judges the generation of the current-carrying failure in the X phase in Step 104 when the duty command value αx is not within the above-identified range (αLo≦αx≦αHi), that is the answer of Step 103 is NO.

Where the absolute value of the detected phase current value Ix is higher than the predetermined value Ith (|Ix|>Ith, that is the answer in Step 101 is NO), where the rotational angle velocity ω is than the predetermined threshold value ωo (|ω|>ωo, that is the answer in Step 102 is NO), or where the duty command value αx is within the above-identified range (αLo≦αx≦αHi, that is the answer in Step 103 is YES), the abnormal judging section 31 judges no generation of the current-carrying failure in the X phase, that is the X phase is normal in Step 105.

Where there happens the current-carrying failure in the X phase (any one of U, V, W phases) by the wire breaking, the phase current value Ix in this happened phase is zero. There are other two cases listed hereinafter where the phase current value Ix becomes zero or almost zero other than the generation of the wire breaking:

Case 1; where the rotational angle velocity of motor reaches to the maximum rotational number Case 2; where the current command value is almost zero itself.

In light of this two cases also, the one embodiment of the present invention operates at first to compare the phase current value Ix of the X phase to the predetermined value Ith to judge by this comparison whether the phase current value Ix is zero or not. Then it is to judge whether the detected state is in the Case 1, or 2 that the phase current value Ix is zero or almost zero in other condition than the wire breaking. Where there is neither in Case 1 nor in Case 2, it is judged as the generation of the wire breaking in the X phase.

That is to say, where an extreme value of the duty command αx is output even though the rotational angle velocity ω is not enough value in which the phase current value Ix is under the predetermined value Ith around zero, the generation of the current-carrying failure is judged in the X phase. Therefore, the embodiment of the present invention executes said judgment sequentially in each phase of U, V, W in order to identify the phase generated the current-carrying failure.

It is eliminated for quick understanding in the flow chart of FIG. 6 that said judgment is executed under the condition that the voltage of the power source is over enough voltage to drive the motor 12. The final decision of the abnormal state is executed whether the detected condition of the judgment of the current-carrying failure is continued over the predetermined time interval in predetermined Step 104.

The micro computer 17 of the ECU 11 of the one embodiment changes the control mode of the motor 12 based on the result of the abnormal judgment in the abnormal judging section 31. In the concrete, the abnormal judging section 31 outputs the result of the abnormal judgment including the current-carrying failure as a detected abnormal signal S_tm. The current command calculating section 23 and the motor control signal generating section 24 execute to calculate a current command value according to the detected abnormal signal S_tm and to generate the motor control signal. As a result, the micro computer 17 changes finally the control mode of the motor 12.

In more detail, the ECU 11 in the one embodiment has three modes of "normal control mode", "assist stopping mode" and "two phases driving mode". The "normal control mode" is a control mode in normal state. The "assist stopping mode" is the control mode where it is in the generation of the abnormal state stopping driving the motor 12. The "two phases driving mode" is the control mode where there is the current-carrying failure in any of each phase of the motor 12. The current command calculating section 23 and the motor control signal generating section 24 execute respectively to calculate the current command value in normal state and to generate the motor control signal when the detected abnormal signal S_tm output from the abnormal judging section 31 is corresponded to the "normal control mode".

On the other hand, the current command calculating section 23 and the motor control signal generating section 24 execute respectively to calculate the current command value and to generate the motor control signal in order to stop the driving of the motor 12 when the detected abnormal signal S_tm output from the abnormal judging section 31 is corresponded to the "assist stopping mode". Besides, they select the "assist stopping mode" where there happens the abnormal state in the machine system or in the torque sensor 14, or there happens to generate an excess current in the generation of the abnormal state in a power distributing system. The "assist stopping mode" has two modes not only to stop immediately the driving of the motor 12 but also to decrease gradually output force from the motor 12, that is to decrease the assisting force then finally to stop the motor 12. In this later case, the motor control signal generating section 24 decrease gradually the absolute value of the q-axis current command value Iq* output as the current command value. The micro computer 17 is constructed to change each switching element consisting of the driving circuit 18 to an open state after stopping the motor 12 and to open an un-illustrated power relay.

The abnormal detecting signal S_tm corresponding to the "two phases driving mode" includes information identifying the phase generated the current-carrying failure. Where the abnormal detecting signal S_tm output from the abnormal judging section 31 corresponds to the "two phase driving mode", the motor control signal generating section 24 executes to generate the motor control signal to continue the driving of the motor where the remaining two phases except for the phase generated the current-carrying failure are the phases of the current-carrying.

In detail, as shown in FIG. 4, the motor control signal generating section 24 of the one embodiment includes a first current control section 24a and a second current control section 24b. The first current control section 24a calculates each phase command value Vu*, Vv*, Vw* by executing the current feedback control. The second current control section 24b calculates each phase command value Vu, Vv, Vw by executing the phase current feedback control. Where the abnormal detecting signal S_tm input from the abnormal judging section 31 corresponds to the "two phases driving mode", the motor control signal generating section 24 execute to output the motor control signal based on the each phase command value Vu, Vv, Vw calculated by the second current control section 24b.

In more detail, as shown in FIG. 5, the second current control section 24b includes a control phase selecting section 32 and a phase current command value calculating section 33. The control phase selecting section 32 selects as the control phase one phase from the remaining two phases other than the phase generated the current-carrying failure. The phase current command value calculating section 33 calculates the phase current command value Ix* (X is any of U, V, W) relating to the phase selected as the selected control phase. The second motor control signal generating section 24b executes the phase current feedback control based on the deviation ΔIx between the phase current value Ix selected as the control phase and its phase current command value Ix* (Ix) to calculate each phase voltage command value Vu, Vv, Vw in order to execute the motor driving in the remaining two current-carrying phase other than the phase generated the current-carrying failure.

In the concrete, the phase current command value Ix** output from the phase current command value calculating section 33 is input into a guard processing section 34. The guard processing section 34 processes the phase current command value Ix* to output a phase current command value Ix to a subtracting circuit 35. The subtracting circuit 35 receives also the phase current value Ix selected by the control phase selecting section 32 to subtract the phase current value Ix from the phase current command value Ix so that it calculates said phase current deviation ΔIx to output the calculated phase current deviation ΔIx to a F/B control section 36. The F/B control section 36 multiplies the input phase current deviation ΔIx by a PI gain of a predetermined F/B gain to calculate a phase voltage command value Vx* of the selected control phase.

The phase voltage command value Vx* calculated by the F/B control section 36 is input into a phase voltage command value calculating section 37. The phase voltage command value calculating section 37 calculates each phase voltage command value Vu, Vv, Vw** based on the phase voltage command value Vx* of the selected control phase.

As a result, the phase generated the current-carrying failure is not in current-carrying and phase angles of current-carrying phases in two phases driving are shifted by 2π, that is 180 degrees. Therefore, the phase voltage command value of the phase generated the current-carrying failure is zero and the phase voltage command value of the other phase of the remaining two phases in the current-carrying is calculated by reversing a mark of plus or minus of the phase voltage command value Vx* of the identified control phase. The second current control section 24b of the one embodiment is constructed to output each phase voltage command value Vu, Vv, Vw** calculated by the above-identified way to the PWM transforming section 30.

The phase current command calculating section 33 calculates phase current command value Ix* generating the q-axis current value Iq of the motor current corresponding to the q-axis current command value Iq* of the control target value of the motor torque, that is a required torque, except for the predetermined rotational angle corresponding to the phase generated the current-carrying failure in the two phases driving.

In the concrete, the phase current command calculating section 33 calculates one of the remaining two phases according to the phase generated the current-carrying failure based on next three equations of (1) to (3):

In current-carrying failure of U phase;

$$I_v^* = \frac{I_q^*}{\sqrt{2}\cos\theta} \quad (1)$$

In current-carrying failure of V phase;

$$I_u^* = \frac{-I_q^*}{\sqrt{2}\sin\left(\theta - \frac{\pi}{6}\right)} \quad (2)$$

In current-carrying failure of W phase;

$$I_v^* = \frac{I_q^*}{\sqrt{2}\sin\left(\theta + \frac{\pi}{6}\right)} \quad (3)$$

Figure 7:
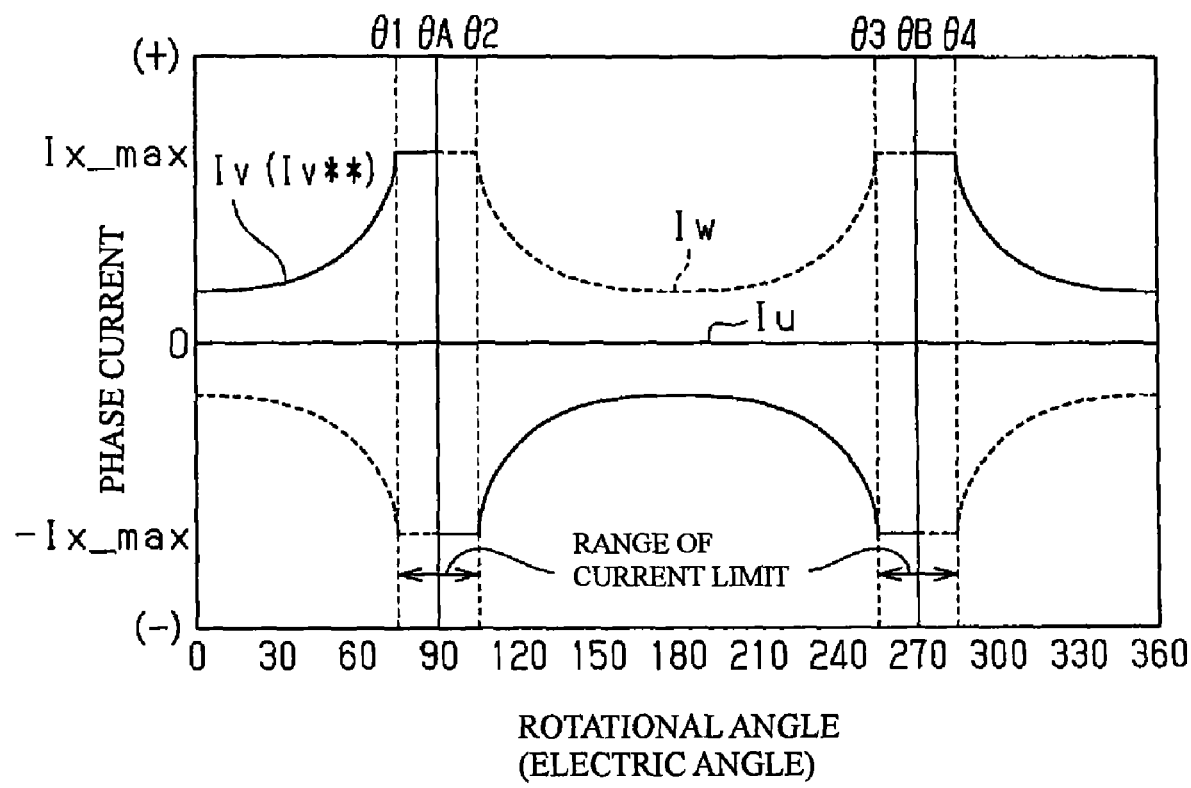
FIG. 7 is an explanatory diagram showing the transition of each phase current at the two phases driving when the U phase is in the current-carrying failure.

Three equations (1) to (3) calculate the phase current command Ix* changing like a secant curve or a cosecant curve in making the predetermined rotational angles θA, θB corresponding to the phase generated the current-carrying failure as an asymptote as shown in FIG. 7. The secant curve is a curve based on a reverse number of "cos θ", that is "1/cos θ" or "sec θ" and the cosecant curve is a curve based on a reverse number of "sin θ", that is "1/sin θ" or "cosec θ". Since the phase current feedback control is executed based on the phase current command values Ix* changing like the secant curve or the cosecant curve, the q-axis current value Iq of the motor current corresponding to the q-axis current command value Iq* of the demanded torque is generated except for the predetermined rotational angle θA, θB corresponding to the asymptote as shown in FIG. 8.

Figure 8:
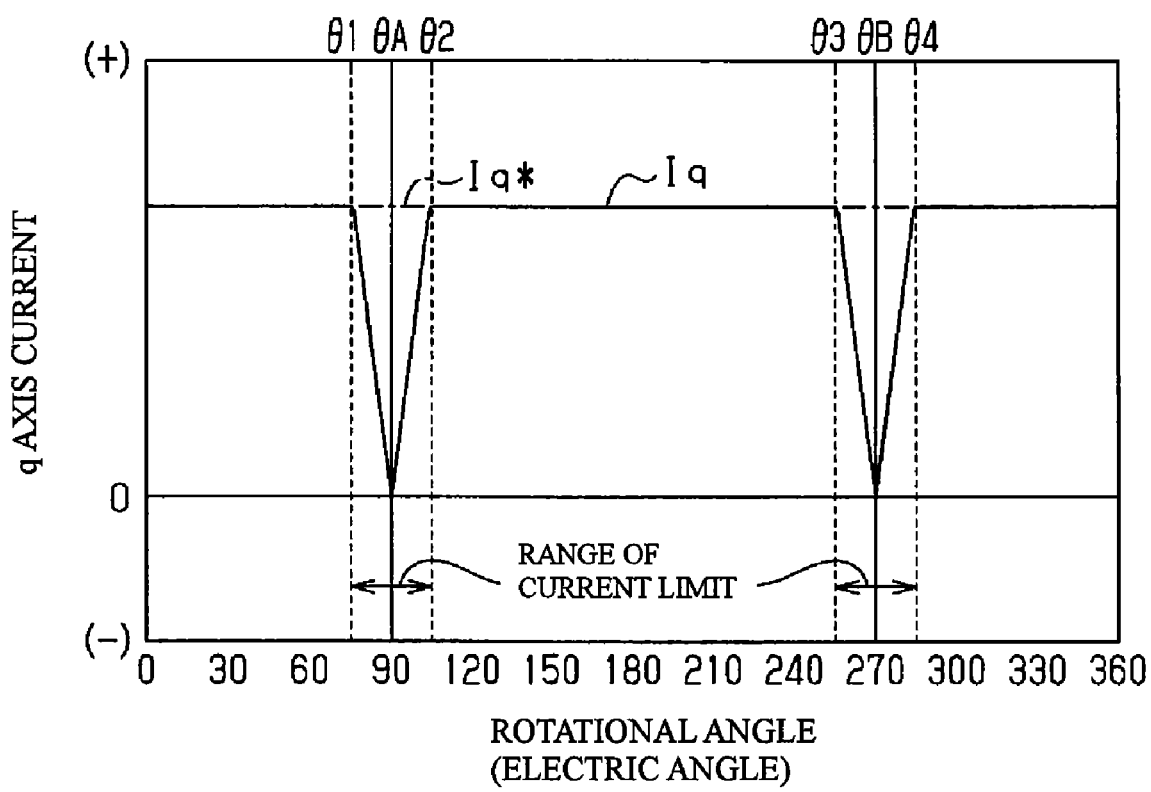
FIG. 8 is an explanatory diagram showing the transition of the q-axis current at the two phases driving when the U phase is in the current-carrying failure.

FIG. 7 and FIG. 8 show an example where the U phase is the phase of the current-carrying failure and the two phases of the V phase and the W phase are the phase of the current-carrying. The rotational angles θA, θB corresponding to each asymptote are respectively "90 degrees" and "270 degrees" in a range of zero degree to 360 degrees where smaller value is θA and larger value is θB. Where the V phase is that of the current-carrying failure not shown in any Figures, the predetermined rotational angles θA, θB are respectively "30 degrees" and "210 degrees". And where the W phase is that of the current-carrying failure not shown in any Figures, the predetermined rotational angles θA, θB are respectively "150 degrees" and "330 degrees".

In actual, there is a maximum upper limit of the absolute value of the possible current-carrying in each motor coils 12u, 12v, 12w so that a guard processing is executed to limit the phase current command value Ix* output from the phase current command calculating section 33 within a predetermined range of $-Ix\_max \leq Ix^* \leq Ix\_max$ in the guard processing section 34 where the "Ix_max" is a maximum value of the possible current-carrying in the X phase (U, V, W phases) and the "$-Ix\_max$" is a minimum value of the possible current-carrying. The maximum value is regulated by a rated current etc. of each switching element constructing the driving circuit 18. Therefore, the phase current command value Ix** is constant at the upper limit (Ix_max) or the lower limit ($-Ix\_max$) after the guard processing in the guard processing range of the limited current (current limit range $\theta1 \leq \theta \leq \theta2$, $\theta3 \leq \theta \leq \theta4$).

In other words, the micro computer 17 of the one embodiment generates the motor current corresponding to the demanded torque except for the range of the current limit ($\theta1 \leq \theta \leq \theta2$, $\theta3 \leq \theta \leq \theta4$) set adjacent to the predetermined rotational angle θA, θB corresponding to the asymptote by the way of execution of the phase current feedback control in order to execute the current-carrying of the phase current changing like the secant curve or the cosecant curve relative to each phase of current-carrying in the two phases driving. Thereby, there is no generation of a large torque ripple even in the generation of the current-carrying failure to maintain a good steering feeling and exerting an assisting force.

Next, the judgment of the abnormal state, changing to the control mode and operating sequence of generation of the motor control signal in two phases driving will be explained hereinafter.

Figure 9:
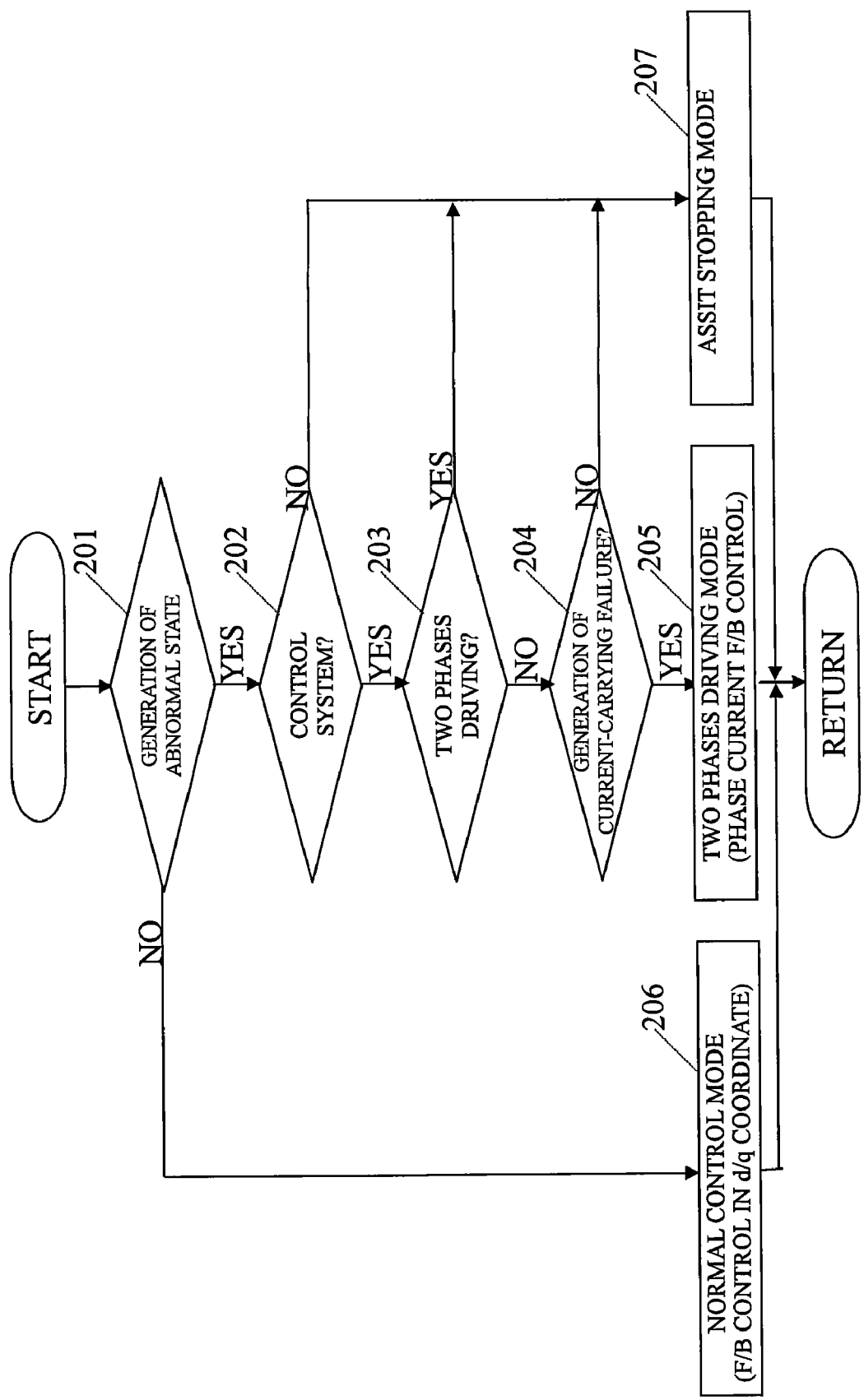
FIG. 9 is a flow chart showing the processing steps to judge the abnormal and to change the control mode.

As shown in a flowchart in FIG. 9, the micro computer 17 judges whether any abnormal state is generated in Step 201. When the micro computer 17 judges the generation of the abnormal state, that is to say YES in Step 201, it judges next whether the abnormal state is that of control system in Step 202. When the micro computer 17 judges the generation of the abnormal state in the control system, that is YES in Step 202, it judges next whether the mode of the present control is the mode of the two phases driving in Step 203. When the micro computer 17 judges that it is not the mode of the two phases driving, that is NO in Step 203, it judges next whether the abnormal state of the control system is the generation of the current-carrying failure in Step 204. When the micro computer 17 judges the generation of the phase of the current-carrying failure, that is to say YES in Step 204, it executes an output of the motor control signal to make two remaining phases except for the phase of the current-carrying failure as the current-carrying phase in Step 205, this mode is called as the two phases driving mode.

As explained above, the output of the motor control signal in the two phases driving mode is practiced by calculating the phase current command value changing like the secant curve or the cosecant curve in making as the asymptote the predetermined rotational angle θA, θB according to the phase generated the current-carrying failure and by executing the feedback control of the phase current based on the calculated phase current command value.

Figure 10:
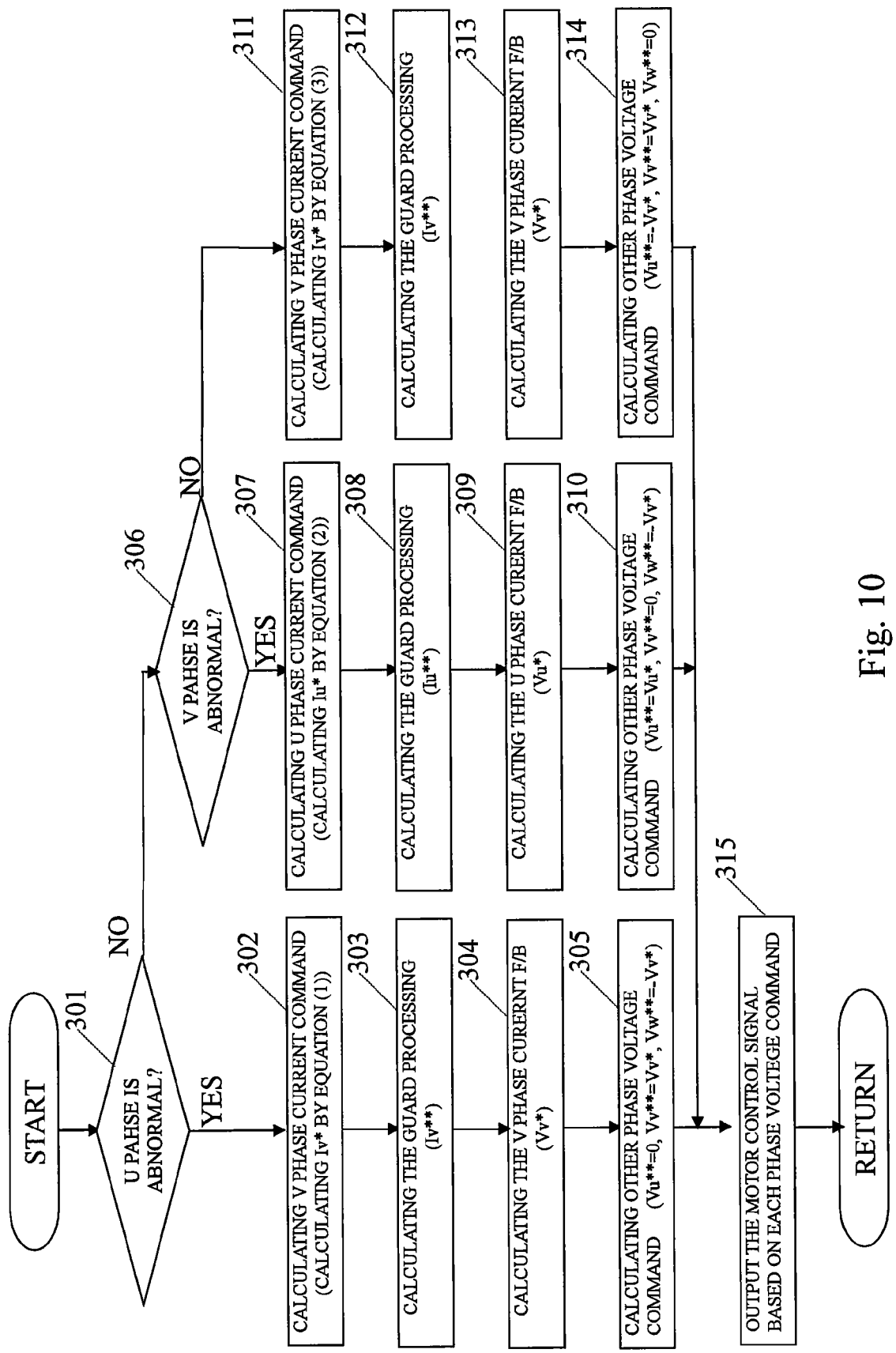
FIG. 10 is a flow chart showing the processing steps of the generation of the motor control signal at the two phases driving.

In actual, as shown in a flow chart of FIG. 10, the micro computer 17 judges at first whether the phase generated the current-carrying failure is the U phase in Step 301. When the micro computer 17 judges the U phase, that is to say YES in Step 301, it calculates the phase current command value Iv* of the V phase based on the equation (1) in Step 302. The micro computer 17 executes next the guard processing calculation of the phase current command value Iv* to limit the calculated phase current command value Iv within the predetermined range in Step 303, And the micro computer 17 executes the phase current feedback control based on the phase current command value Iv after the guard processing to calculate the phase voltage command value Vv* of the V phase in Step 304. The micro computer 17 calculates each of the phase voltage command values Vu, Vv, Vw** based on the phase voltage command value Vv* in Step 305 as Vu=0, Vv=Vv*, Vw**=$-$Vv*.

On the other hand, when the micro computer 17 judges that the phase generated the current-carrying failure is not the U phase, that is to say NO in Step 301, it judges whether the phase generated the current-carrying failure is the V phase in Step 306. When the micro computer 17 judges the V phase is the phase generated the current-carrying failure, that is YES in Step 306, it calculates the phase current command value Iu* of the U phase based on the equation (2) in Step 307, Next, the micro computer 17 executes the guard processing calculation of the phase current command value Iu* to limit the calculated phase current command value Iu within the predetermined range in Step 308. And the micro computer 17 executes the phase current feedback control based on the phase current command value Iu after the guard processing in Step 309. The micro computer 17 calculates each of the phase voltage command values Vu, Vv, Vw** based on the phase voltage command value Vu* calculated by executing the phase current feedback control in Step 310 as Vu**=Vu*, Vv=0, VW=$-$Vu*.

More over, when the micro computer 17 judges that the phase generated the current-carrying failure is not the V phase, that is to say NO in Step 306, it calculates the phase current command Iv* of the V phase based on the equation (3) in Step 311. Next, the micro computer 17 executes the guard processing calculation to limit the calculated phase current command value Iv within the predetermined range in Step 312. And the micro computer 17 executes the phase current feedback control based on the phase current command value Iv after the guard processing in Step 313. The micro computer 17 calculates the phase voltage command values Vu, Vw of the remaining two phases of V, W phases based on the calculated phase voltage command value Vv* in Step 314 as Vu**=$-$Vv*, Vv**=Vv*, Vw**=0.

The micro computer 17 then generates in Step 315 the motor control signal based on each phase voltage command values Vu, Vv, Vw calculated by said Steps 305, 310 or 314**.

Besides, in Step 201, when the micro computer 17 judges that there is no abnormal state, that is to say NO in Step 201, it executes to output the motor control signal by executing the current feedback control in the d/q coordinate system, that is in the normal control mode in Step 206. The micro computer 17 moves to the assist stopping mode in Step 207 when it judges that there is the abnormal state in other system than the control system in Step 202, that is NO in Step 202, when it judges that the two phases driving mode is on in Step 203, that is YES in Step 203, or when it judges that there is the generation of the abnormal state other than the generation of the current-carrying failure in Step 204, that is NO in Step 204, And it is executed to output the motor control signal stopping the driving of the motor 12 and to open the power relay and so on.

[Rotational Angle Compensating Control]

The rotational angle compensating control, that is an offset control, of the embodiment of the present invention will be explained hereinafter.

As shown in FIG. 5, a rotational angle compensating control section 40 is provided in the second current control section 24b corresponding to the two phases driving at the generation of the phase of the current-carrying failure to compensate the rotational angle θ of the motor 12 input to the second current control section 24b in order to correct an offset of the phase between the phase current command value Ix* and the phase current value Lx in the phase current feedback control in the two phases driving. Based on the rotational angle θ' compensated by the rotational angle compensating section 40, the phase current feedback control is executed to make the smooth rotation of the motor, realizing the good feeling of the steering without any sticking feeling.

Figure 11:
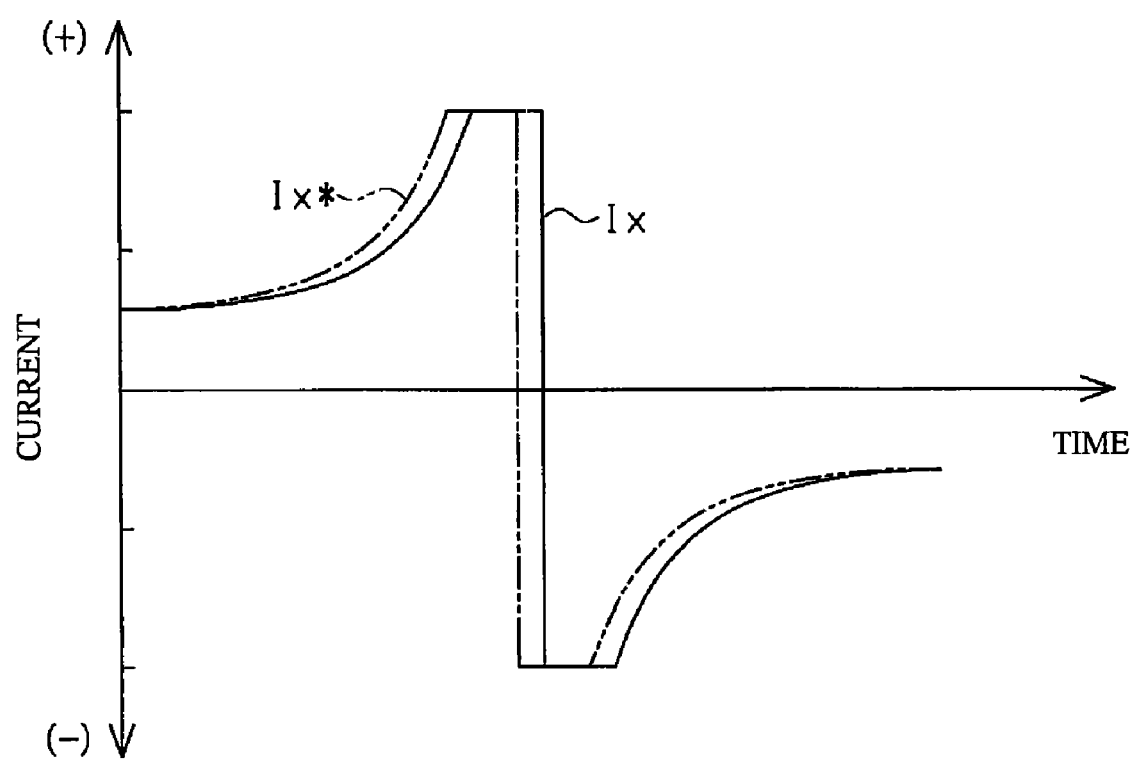
FIG. 11 is an explanatory diagram showing the phase delay of the actual current value against the current command value at the current control.

The mark of plus or minus of the value of the phase current as the current-carrying phase is reversed at one side or the other side of the each rotational angle θA, θB corresponding to the asymptote referred to FIG. 7 where the current control is executed by carrying the phase current changing like the secant curve or the cosecant curve relative to each current-carrying phase in two phases driving. Therefore, where there is an offset of the phases between the phase current command value Ix* as the current command and the phase current value Ix as an actual current as shown in FIG. 11, there is an existence of an area of un-coincidence between the mark of the current command value and the mark of the actual current value adjacent to the rotational angle θA, θB when the rotational angle θ of the motor 12 passes just through the rotational angle θA, θB corresponding to the asymptote. In other words, if it is happened, it may result the existence of the area to generate the current rotating the motor 12 in a reversal direction so that the generation of the reversal current prevent the smooth rotation of the motor, as a result to reduce following-ability of the motor relative to the steering operation and to give a sticking feeling to a driver.

In order to prevent this phase offset, the second current control section 24b of the micro computer 17 of the one embodiment compensates or offsets the rotational angle θ of the motor 12, which is the base of the phase current feedback control, to correct the phase offset between the phase current command value Ix* and the phase current value Ix in the phase current feedback control at the two phases driving.

In detail, the rotational angle compensating section 40 provided in the second current control section 24b in the one embodiment compensates the rotational angle θ in a forward direction in accordance with the rotational direction of the motor 12. The phase current command value calculating section 33 calculates the phase current command value Ix* based on the compensated rotational angle θ'.

A phase angle of the actual current carried in the motor tends to be delayed from a phase angle of the current command value in the current control because there are mechanical factor such as a back-lash in the motor, a delay of the calculation or a phase angle delay of the current control and so on. Therefore, in consideration of the time delay in the two phases driving, it is possible to correct the phase angle delay of the phase current value Ix against the phase current command value Ix* by advancing the rotational angle θ according to the rotational direction. Thereby, the one embodiment of the present invention can reduces the area of the un-coincidence of the mark of the actual current command value against the mark of the current command value generated adjacent to the predetermined rotational angle θA, θB when the rotational angle θ of the motor 12 passes through the predetermined angle θA, θB so that the motor can rotate smoothly and the follow-ability against the steering operation can be improved.

Figure 12:
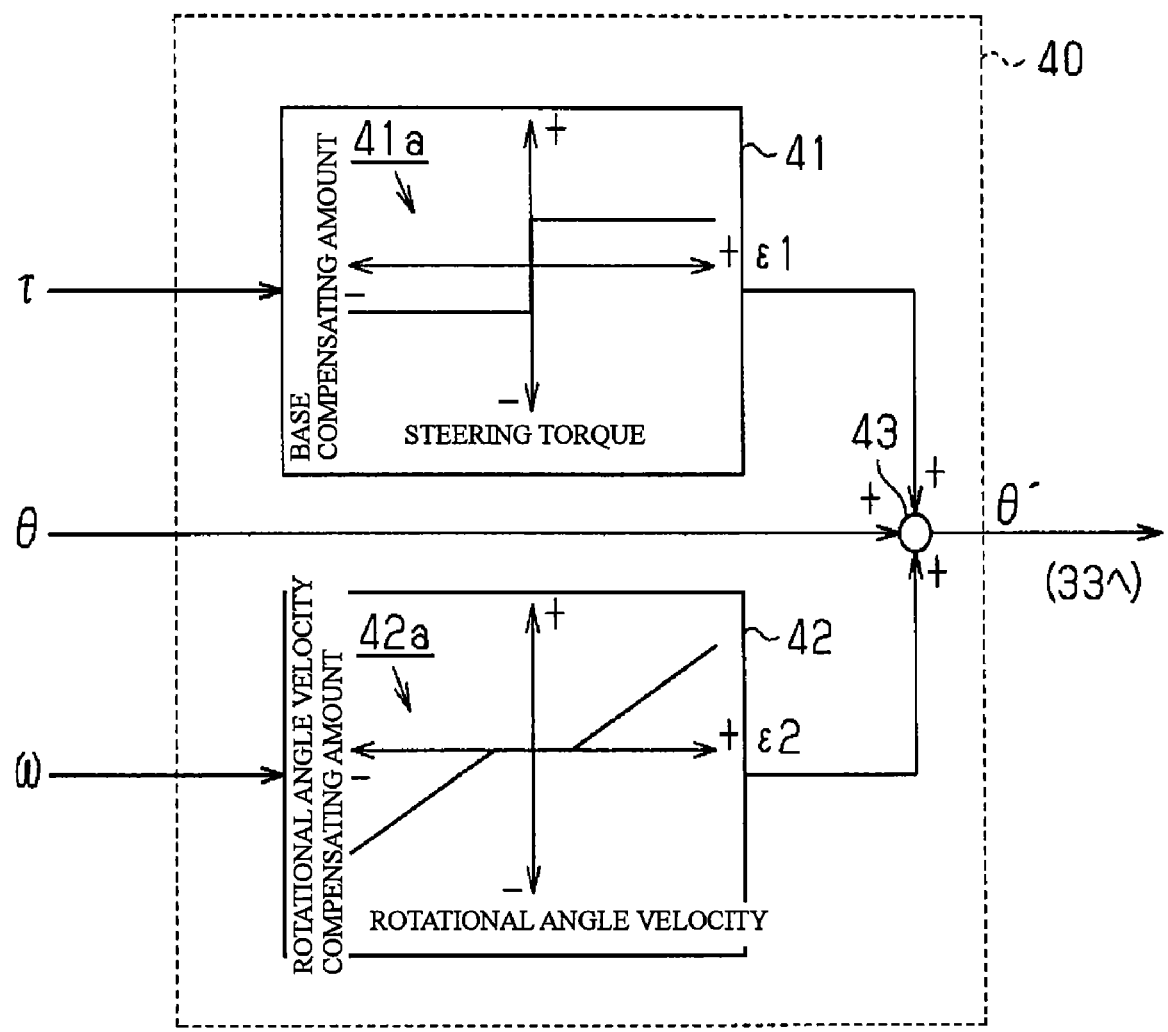
FIG. 12 is a control block diagram of a rotational angle compensating control section.

In detail, as shown in FIG. 12, the rotational angle compensating control section 40 of the one embodiment includes a base compensating amount calculating section 41 and a rotational angle velocity compensating amount calculating section 42. The base compensating amount calculating section 41 calculates a base compensating amount $\epsilon 1$ to compensate the rotational angle θ in the advanced direction according to the rotational direction of the motor 12. The rotational angle velocity compensating amount calculating section 42 calculates a rotational angle velocity compensating amount $\epsilon 2$ in accordance with the rotational angle velocity ω of the motor 12.

The steering torque τ is input into the base compensating amount calculating section 41 judging the rotational direction of the motor 12 based on the mark of the input steering torque τ. The base compensating amount calculating section 41 calculates the base compensating amount $\epsilon 1$ to compensate the input rotational angle θ in the advanced direction. Besides, the base compensating amount calculating section 41 of the one embodiment judges the rotational direction of the motor 12 and calculates the base compensating amount $\epsilon 1$ by the way of using a map 41a relating the steering torque τ to the base compensating amount $\epsilon 1$. The base compensating amount $\epsilon 1$ is set a constant value according to the mark of the steering torque τ in the map 41a of the one embodiment of the present invention.

The rotational angle velocity compensating amount calculating section 42 calculates the rotational angle velocity compensating amount $\epsilon 2$ in the way to compensate the rotational angle θ that the faster the detected rotational angle velocity ω of the motor 12 is or the larger the absolute value of the detected rotational angle velocity ω is, the lager the compensated amount of the rotational angle θ in the advanced direction is. Besides, in the one embodiment, the rotational angle velocity compensating amount calculating section 42 has also a map 42a relating the rotational angle velocity ω to the rotational angle velocity compensating amount $\epsilon 2$. The rotational angle velocity compensating amount $\epsilon 2$ is set in the map 42a in a way that the larger the absolute value of the rotational angle velocity ω is, the larger the absolute value of the rotational angle velocity compensating amount $\epsilon 2$ is. The rotational angle velocity compensating amount calculating section 42 executes to calculate the rotational angle velocity compensating amount $\epsilon 2$ by referring the input rotational angle velocity ω to the map 42a.

To an adding circuit 43 are input the calculated base compensating amount $\epsilon 1$ and the calculated rotational angle velocity compensating amount $\epsilon 2$ with the rotational angle θ to add them to the rotational angle θ input to the rotational angle compensating control section 40. In other wards, the rotational angle compensating control section 40 of the one embodiment compensates the input rotational angle θ in the way of advancing a predetermined angle according to the rotational direction of the motor 12 and also compensates in the way that the faster the rotational angle velocity ω of the motor 12 is, the larger the compensating amount in the advanced direction is. The compensated rotational angle θ' is output to the phase current command value calculating section 33.

[Verification]

The effect of the rotational angle compensating control will be verified hereinafter.

Figure 13:
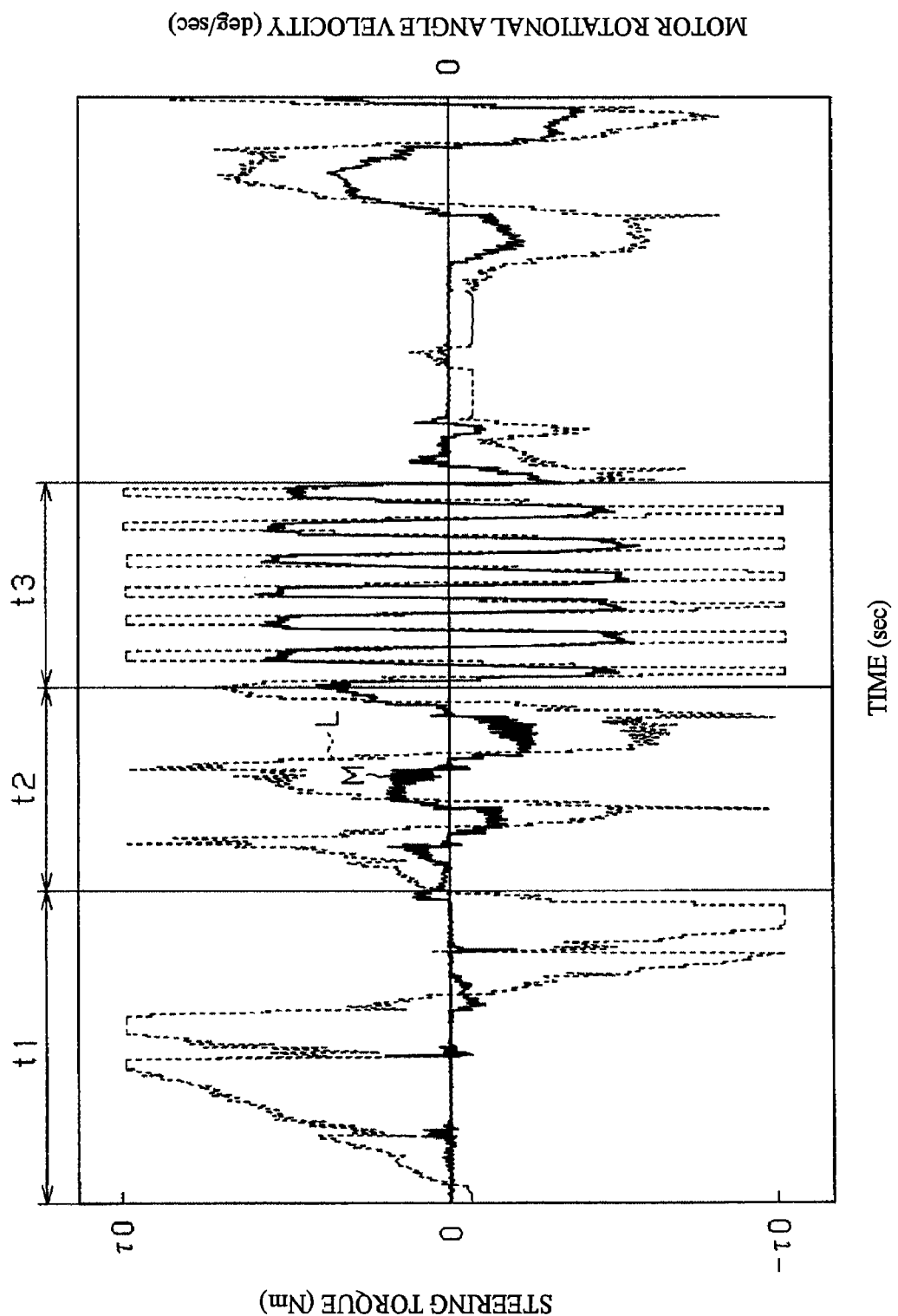
FIG. 13 is a graph showing the relation between the steering torque and the rotational angle velocity at the two phases driving without the rotational angle compensating.
Figure 14:
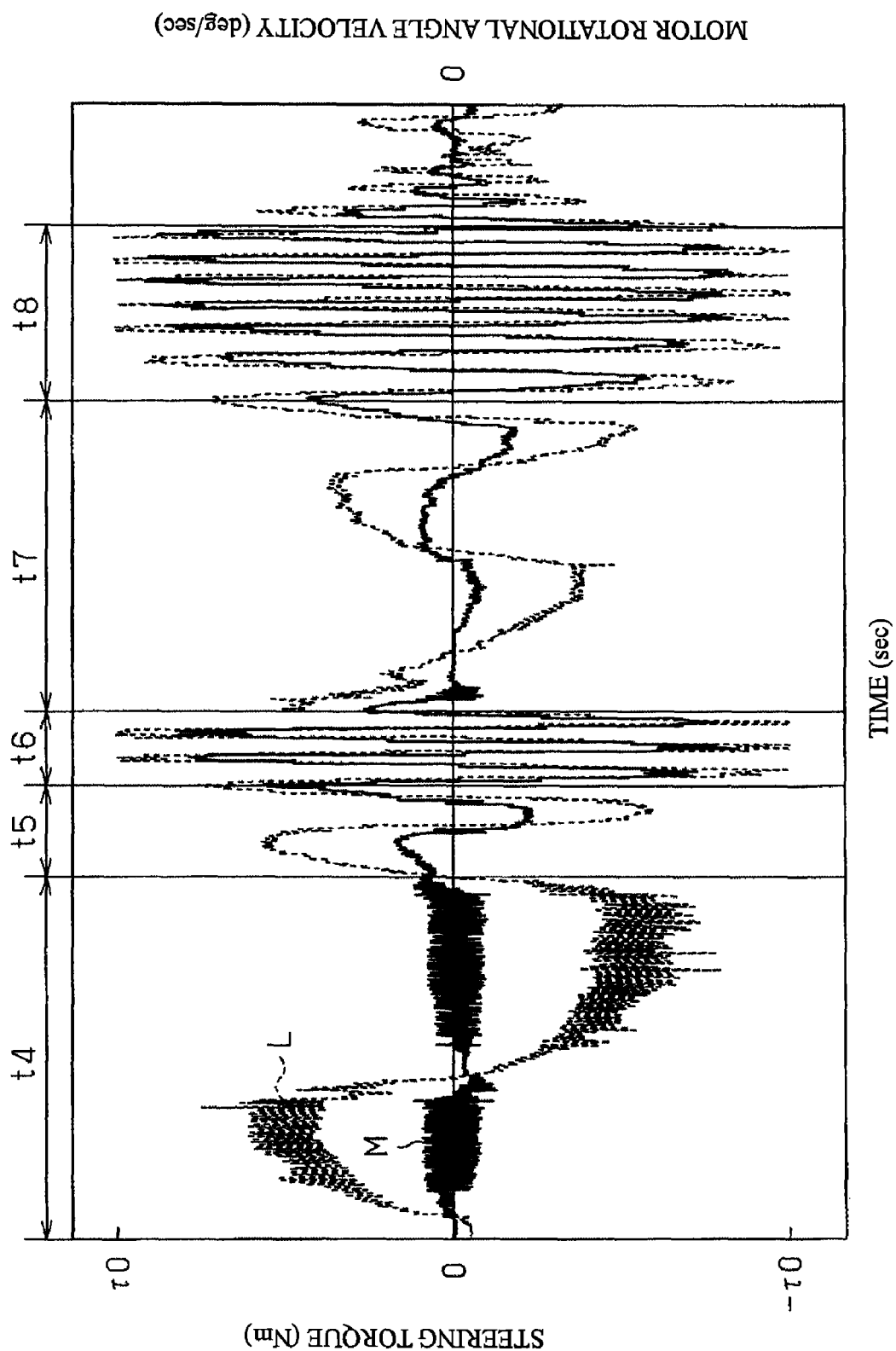
FIG. 14 is a graph showing the relation between the steering torque and the rotational angle velocity at the two phases driving with the rotational angle compensating.

FIG. 13 and FIG. 14 are diagrams showing the relation between the steering torque τ and the rotational angle velocity ω at the two phases driving, that is to say the following-ability of the motor relative to the steering operation. FIG. 13 shows the diagram without the rotational angle compensating control and FIG. 14 shows the diagram with the rotational angle compensating control. Besides, a wave shape L represented by a doted line shows a transition of the steering torque τ and a wave shape M represented by a solid line shows a transition of the rotational angle velocity ω of the motor 12.

As shown in FIG. 13, the following-ability of the rotational angle velocity ω of the motor 12 against the steering torque τ is respectively low without the rotational angle compensating control where the steering is operated relatively slowly in right and left directions as shown in a range t2 and where the steering is operated quickly in right and left directions as shown in a range t3. Where the steering is operated extremely slowly as shown in a range t1, the rotational angle velocity ω is extremely small even though the value of the steering torque τ reaches |τ0| of a detecting limit. In other words, the motor is not almost rotated to show the generation of the sticking.

On the other hand, as shown in FIG. 14, the following-ability of the rotational angle velocity ω of the motor 12 against the steering torque τ is high with the rotational angle compensating control respectively where the steering is operated relatively slowly in right and left directions as shown in ranges t5, t7 and where the steering is operated quickly in right and left directions as shown in ranges t6, t8. Even though the steering is operated extremely slowly as shown in a range t4, the rotational angle velocity ω can follow with the transition of the steering torque τ.

In other words, by the execution of the rotational angle compensating control the one embodiment of the present invention can reduce the area of the un-coincidence of the mark of the actual current value against the mark of the current command value adjacent to the predetermined rotational angle θA, θB where the rotational angle θ of the motor 12 passes through the predetermined angle θA, θB relative to the asymptote so that it can restrain the generation of the current rotating the motor reversely. Thereby the motor can rotate smoothly so that the good follow-ability of the steering operation can be guaranteed. And also as shown in FIG. 14, there is no state to reach the detected limit |τ0| of the steering torque τ without increasing the absolute value of the rotational angle velocity ω. From this point of view, the good steering feeling can be brought without the sticking feeling.

As explained above, the one embodiment of the present invention can achieve these next effects.

1. The micro computer 17 maintain the output of the motor control signal by executing the current control to generate the phase current changing like the secant curve or cosecant curve in making the predetermined rotational angle according to the phase generated the current-carrying failure as the asymptote in the current-carrying phases where the other two phases than the phase generated the current-carrying failure are the phases of the current-carrying when there is the generation of the current-carrying failure in any phase of the motor. And also the micro computer 17 includes the rotational angle compensating control section 40 compensating the input rotational angle θ of the motor 12. Therefore, the micro computer 17 compensates the rotational angle θ as the base of the current control in order to correct the offset of the phase angle between the phase current command value Ix* as the current command value in the current control and the phase current value Ix as the actual current value at two phases driving which the other two phases than the phase generated the current-carrying failure are the phase of the current-carrying.

The one embodiment of the present invention constructed above can generate the q-axis current value Iq of the motor current in correspondence to the q-axis current command value Iq* of the demand torque except for the range of the predetermined angle θA, θB relative to the asymptote and the current limit area adjacent to the predetermined angle θA, θB. As a result, there are less generation of the large torque ripple at the generation of the phase of current carry-failure to maintain the motor driving in high output performance, that is to say to maintain to exert the assisting force. And the one embodiment of the present invention constructed above can correct the phase offset between the phase current command value and the phase current value at two phases driving so that it reduces the area of the un-coincidence of the mark of the actual current value and the mark of the current command value adjacent to the predetermined rotational angle θA, θB where the rotational angle θ of the motor 12 passes through the predetermined angle θA, θB so that it can restrain the generation of the current driving the motor 12 reversely. Thereby, the motor can rotate smoothly and the follow-ability of the steering operation can be improved, realizing the good steering feeling without the feeling of sticking.

2. The rotational angle compensating control section 40 compensates the rotational angle θ in the advanced direction according to the rotational direction of the motor 12.

In the conventional electric power steering it happen that the phase angle of the actual phase current tends to delay from the phase angle of the current command value in the current control based on the existences of the time delay factor of the mechanical factor such as the back-lash in the motor, the delay of the calculation or the phase angle delay of the current control and so on. Therefore, in consideration of the time delay in the two phases driving, the one embodiment of the present invention constructed above can correct the phase angle delay of the actual phase current value against the phase current command value by advancing the rotational angle θ according to the rotational direction.

3. The rotational angle compensating control section 40 compensates the rotational angle θ in the way, that the faster the rotational angle velocity ω is, the larger the compensating amount of the rotational angle θ in advanced direction is.

Therefore, the one embodiment of the present invention constructed above can correct more accurately the delay of the phase angle of the actual current value against the current command value.

4. The micro computer 17 includes the first current control section 24*a* calculating the phase voltage command values Vu*, Vv*, Vw* of three phases by executing the current feedback control in the d/q coordinate system and the second current control section 24*b* calculating each phase voltage command value Vu, Vv, Vw** by executing the phase current feedback control. In the normal current control, the one embodiment of the present invention executes the output of the motor control signal based on each phase voltage command value Vu*, Vv*, Vw* calculated by the first current control section 24a. In the two phases driving at the generation of the phase of current-carrying failure, it executes the output of the motor control signal based on each phase voltage command value Vu, Vv, Vw** calculated by the second current control section 24b.

One of the most effective factor of the time delay is the delay of the phase angle in the current feedback control. Especially the phase current feedback control tends to make the larger delay of the phase angle than that in the current feedback control of the d/q coordinate system. Therefore, the one embodiment of the present invention constructed above can execute the effects by the two phases driving of the execution of the phase feedback control to output the motor control signal based on the above-identified constructions of 1 to 3.

[Effect in the Slow Velocity Steering]

The effect in the slow velocity steering of the rotational angle compensating control in the one embodiment of the present invention will be explained hereinafter.

Referred to FIG. 14, it is pointed out for transitions of waves M, L in the range t4 corresponding to the slow velocity steering at the rotational angle compensating control. It is recognized that the waves M, L corresponding to the steering torque τ and the rotational angle velocity ω vibrate in small pitch. However the vibration is not dependent to the steering operation by the driver.

Even though the steering operation with the rotational angle compensation is not changed from the steering operation without the rotational angle compensation, the wave M showing the transition of the rotational angle velocity ω vibrates in sandwiching "0" by the execution of the rotational angle compensation as shown in the range t4 of FIG. 14. In other words, the rotational direction of the motor is switching each other in a small amount by the execution of the rotational angle compensation. In other words, the small switching operation of the rotational direction on the slow velocity steering is a main mechanism to restrain the generation of the sticking.

Figure 15:
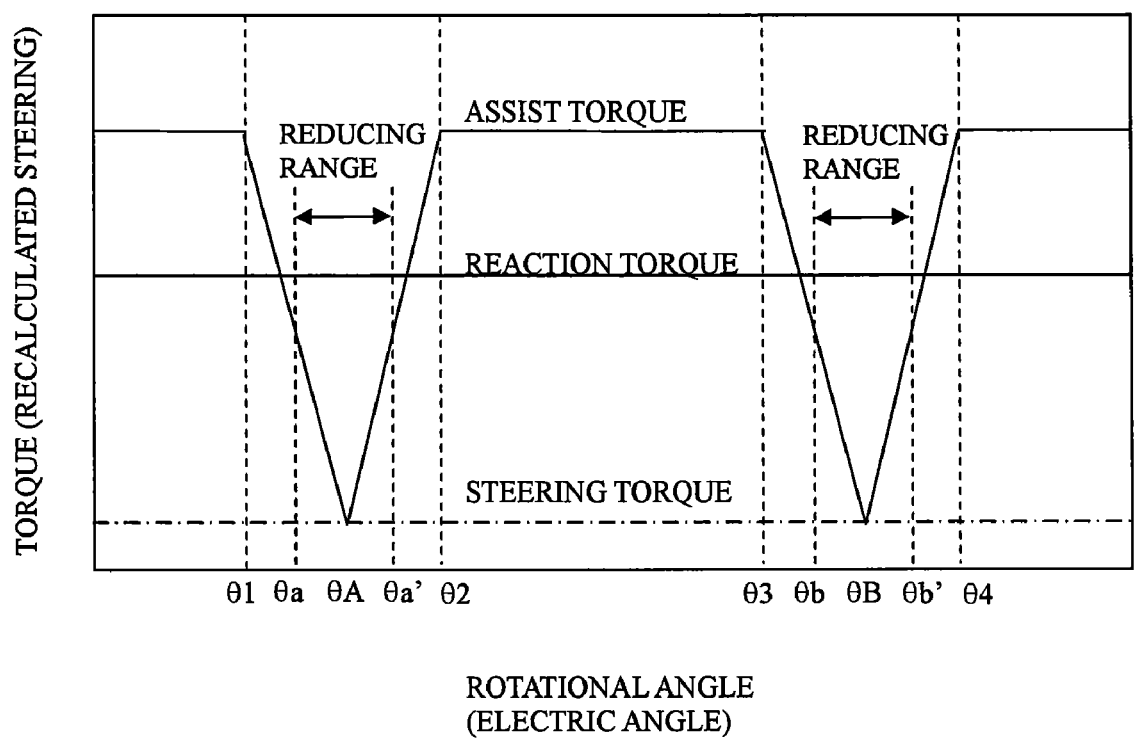
FIG. 15 is an explanatory diagram showing the reducing range adjacent to the predetermined angle changing the direction of each phase current.

In details, as shown in FIG. 15, there exists the range of the rotational angle adjacent to the predetermined rotational angle θA, θB at the two phases driving where a torque in the steering direction, that is to say a sum of the steering torque and the assisting torque is lower than a reaction torque of the reversal direction by the current limit adjacent to the predetermined rotational angle θA, θB at the two phases driving. The range is a reducing range θa<Θ<θa', θb<Θ<θb' where the steering velocity is reduced. The existence of the reducing range is the factor of the generation of the sticking at the slow velocity steering.

A next equation (4) is established by the Preservation Regulation of Energy where a rush velocity into the reducing range is ωin, an escape velocity is ωout, a motor inertia is Jm, a reducing energy is −En in the reducing range.

$$\frac{1}{2}J_m\omega_{out}^2 - \frac{1}{2}J_n\omega_{in}^2 = -E_n \quad (4)$$

Besides, the rush velocity into the reducing range is the value of the rotational angle velocity ω of the rotational angle θa and the escape velocity is the value of the rotational angle velocity ω of the rotational angle θa' where the direction of the steering is from left to right.

Therefore, in order that the rotational angle θ of the motor 12 passes the reducing range without stopping, that is to say escape velocity ωout is larger than zero, the rash velocity ωin is faster than critical velocity ωcr as shown in next equation (5);

$$\omega_{cr} = \frac{180}{\pi}\sqrt{\frac{2E_n}{J_n}} \quad (5)$$

Figure 16:
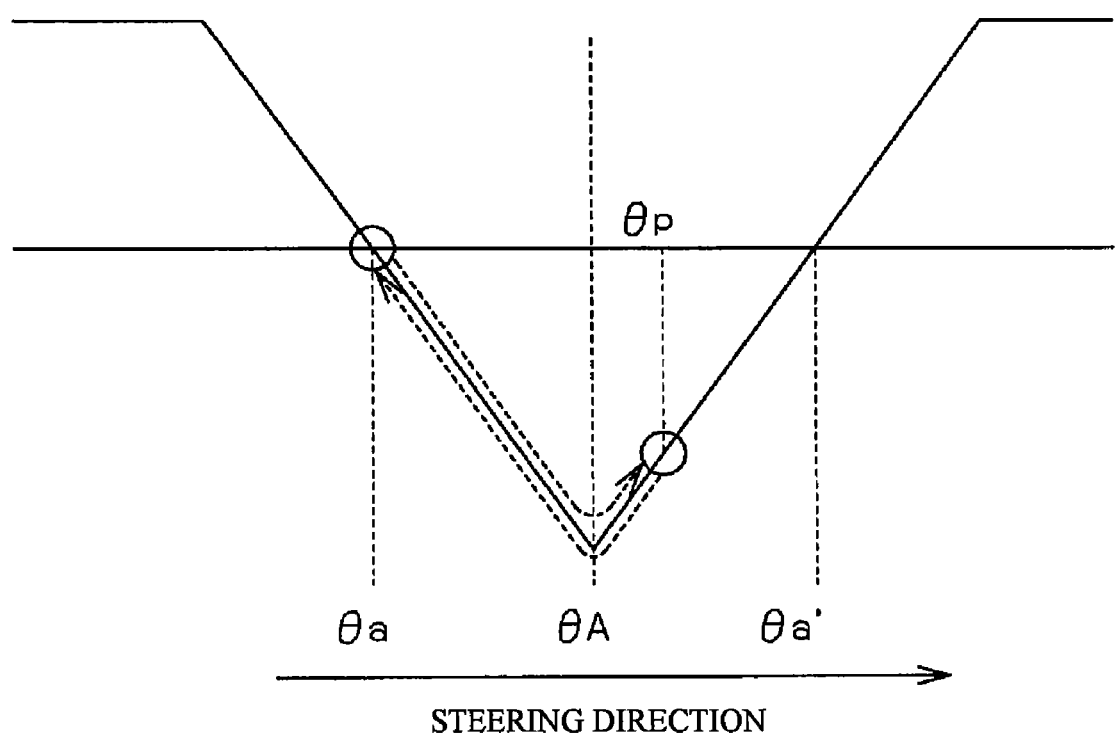
FIG. 16 is an explanatory diagram showing the generation mechanism of the sticking at the slow steering.

In other words, as shown in FIG. 16, at the slow velocity steering where the rotational angle velocity ω is below the critical velocity ωcr(ω≦ωcr), the rotational angle θ of the motor 12 can not pass the reducing range so that the rotational velocity ω is zero for example at the rotational angle Op in front of the rotational angle θa', escape position from the reducing range, in the side of the rotational angle θa of the rush angle. At this place, the torque of the reversing direction is larger than the torque of the steering direction, that is the sum of the steering torque and the assisting torque ("the steering torque"+"the assisting torque"<"the reaction torque"). Therefore, the motor is stopped at the rotational angle Op and rotated reversely to the reversal direction, as shown a dotted arrow to the reversal direction in FIG. 16. Finally, the motor is stopped at the rotational angle θa where the torque of the steering direction is balanced with the torque of the reaction torque. As a result, the sticking is happened where the rotation of the motor can not follow the steering operation as shown in the range t1 of FIG. 13.

However, when the rotational angle compensating control is executed as shown in the range t4 of FIG. 14 there is no generation of the sticking where it is happened in the range t1 of FIG. 13. In replacing of this phenomenon, there is the small switching operation (reversing operation) which the direction of the motor is changeable in the small pitch.

Figure 17:
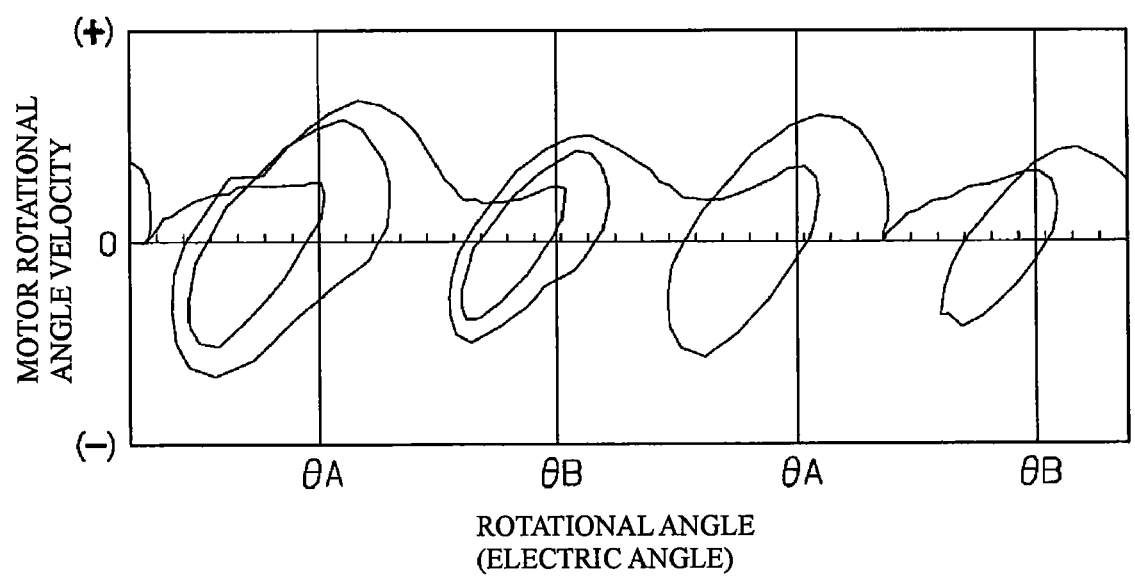
FIG. 17 is a wave diagram showing the transition of the motor rotational angle and the motor rotational angle velocity at the rotational angle compensating control.

FIG. 17 shows a save diagram representing a transition of the rotational angle (electric angle) and the rotational velocity of the motor at the rotational angle compensating control. As shown in FIG. 17, the reversing operation of the motor is generated adjacent to the predetermined rotational angle θA, θB where the mark of the phase current value is reversed. And it shows an increase of the rotational angle velocity ω of the motor by repeating the reverse operation.

Therefore, the motor repeats the reverse operation adjacent to the predetermined rotational angle θA, θB at the slow velocity steering where the rotational angle ω is below the critical velocity ωcr(ω≦ωcr) by executing the rotational angle compensating control constructed of the one embodiment identified above. The motor increase the rotational angle velocity ω by repeating the reverse operation to reach the faster rush velocity ωin than the critical velocity ωcr so that the rotational angle θ of the motor 12 is passed the reducing range generated adjacent to the predetermined rotational angle θA, θB. Thereby, the one embodiment of the present invention constructed above can restrain the generation of the sticking.

Figure 18A:
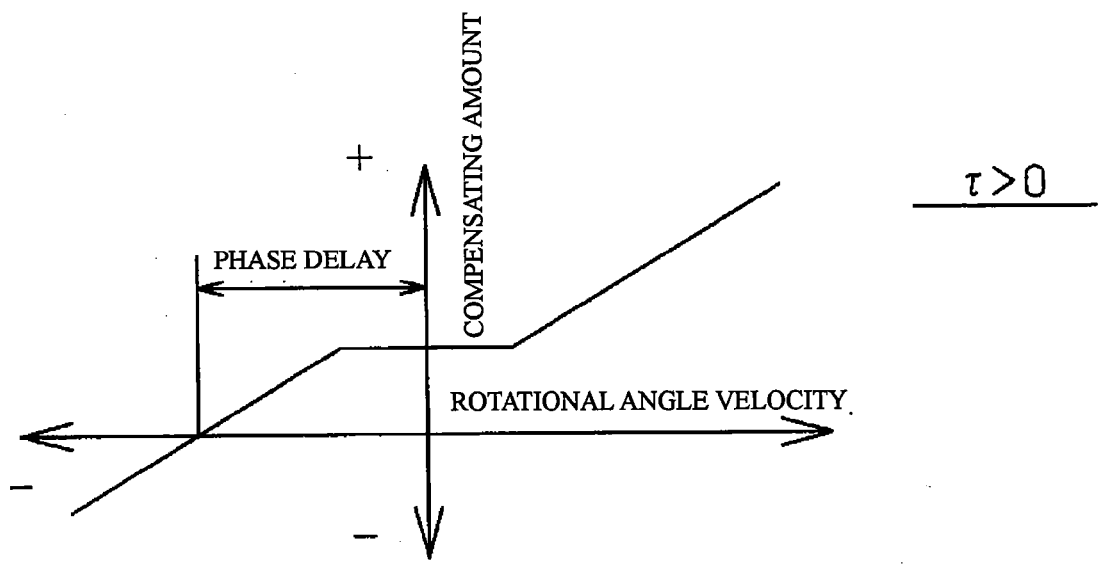
FIGS. 18a, 18b are diagrams of the relation between the compensating amount and the rotational angle velocity at each direction of the steering.
Figure 18B:
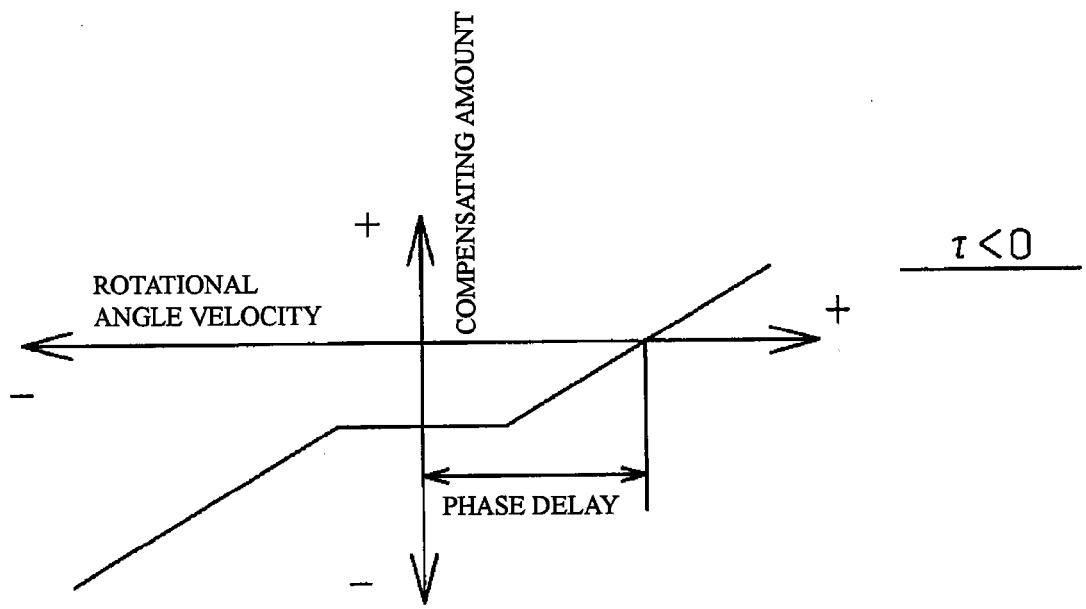

In detail as explained above, the rotational angle compensating control section 40 of the one embodiment calculates the predetermined base compensating amount ε1 according to the mark of the steering torque τ, that is the direction of the steering operation (the steering direction) and the rotational angle velocity compensating amount ε2 according to the rotational angle velocity ω of the motor 12, referred to FIG. 12. FIG. 18a, 18b show in each rotational direction the relation between the rotational angle velocity ω and a superimposed amount of the base compensating amount ϵ1 and the rotational angle velocity compensating amount ϵ2.

As shown in FIGS. 18a, 18b, the rotational angle compensating control section 40 of the one embodiment calculates the compensating amount to compensate the rotational angle θ in the advanced direction in the normal state where the motor 12 rotates to the steering direction in the normal rotation of the motor 12, but occasionally in the reversed direction.

The value of the base compensating amount ϵ1 calculated by the base compensating amount calculating section 41 is concretely constant in accordance with the steering direction, that is the mark of the steering torque τ, to the contrary the value of the rotational angle compensating amount ϵ2 varies in accordance with an increasing of the absolute value of the rotational angle velocity ω. Therefore, in the area where the steering direction is reversed to the rotational direction of the motor 12 and the value of the rotational angle velocity ω is small, the mark of the compensated amount is different from the mark of the rotational angle θ, that is to say the compensated amount is calculated to compensate the rotational angle θ to the delay direction. Thereby, in the embodiment are executed the repetition of the reverse operation in the reducing range adjacent to the predetermined rotational angle θA, θB and the increasing of the rotational angle velocity ω by compensating the rotational angle θ to the delay direction.

The actual current rotating the motor 12 in the reversal direction to the steering direction is occurred in adjacent to the predetermined rotational angle θA, θB by compensating the rotational angle θ to the delay direction, referred to FIG. 11. The one embodiment of the present invention is constructed to exert the reversal assist force to the reversal direction to assist the reverse rotation where the rotational direction of the motor 12 is reversed in the reducing range adjacent to the predetermined rotational angle θA, θB.

Figure 19:
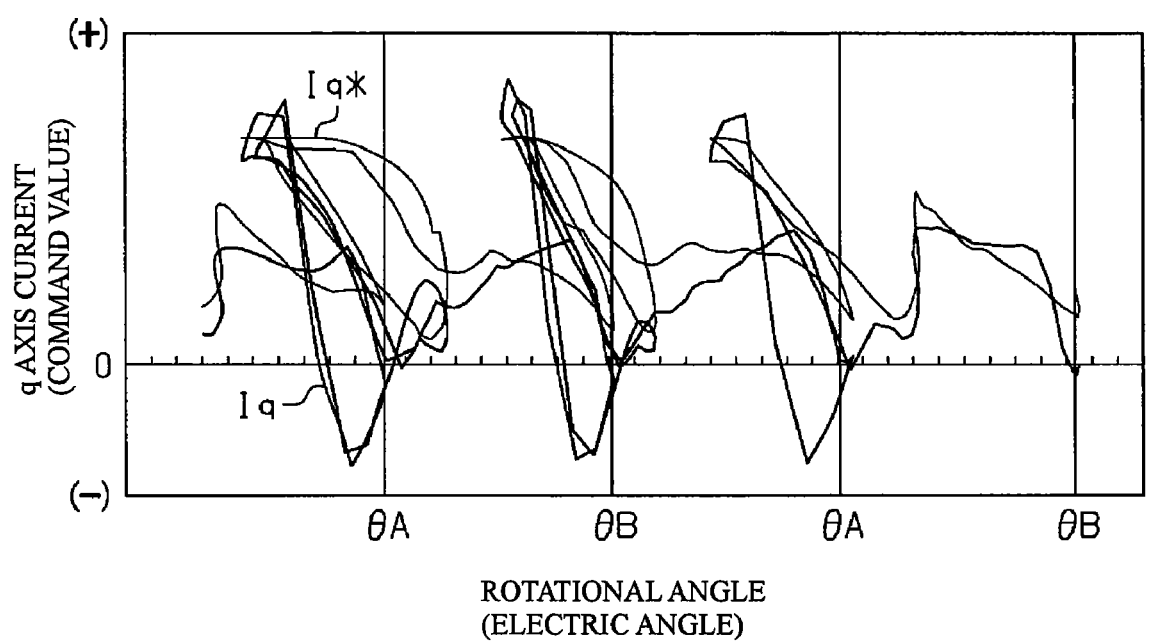
FIG. 19 is a wave diagram showing the transition the q-axis current command value as the current command value and the q-axis current value as the actual current value at each rotational angle.

Besides, FIG. 19 is a wave diagram in each rotational angle θ showing a transition of the q-axis current command value Iq* as the current command value rotating the motor to the steering direction and a transition of the q-axis current value Iq as the actual current value.

The embodiment is constructed to transform given energy as the reversal assisting to the rotational angle velocity ω and to pass through the reducing range by gaining the rush velocity coin being over the critical velocity ωcr.

Where the rush velocity ωin, for example the rotational angle velocity ω in the rotational angle θa is below the critical velocity ωcr, the rotational angle θ of the motor 12 can not pass the reducing range. Therefore, the steering wheel is rotated in reversal direction after stopping at the rotational angle θp1 as shown in FIG. 16.

Figure 20:
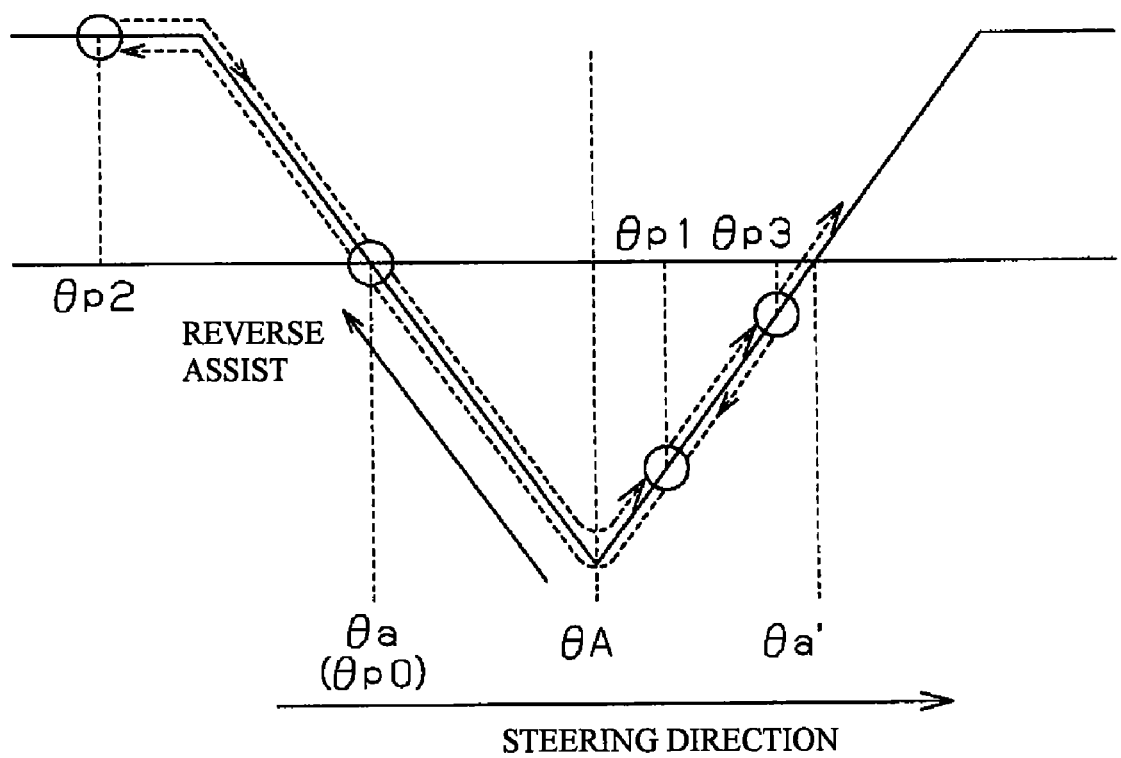
FIG. 20 is an explanatory diagram showing the mechanism increasing the rotational angle velocity by repeating the reverse operation.
Figure 21A:
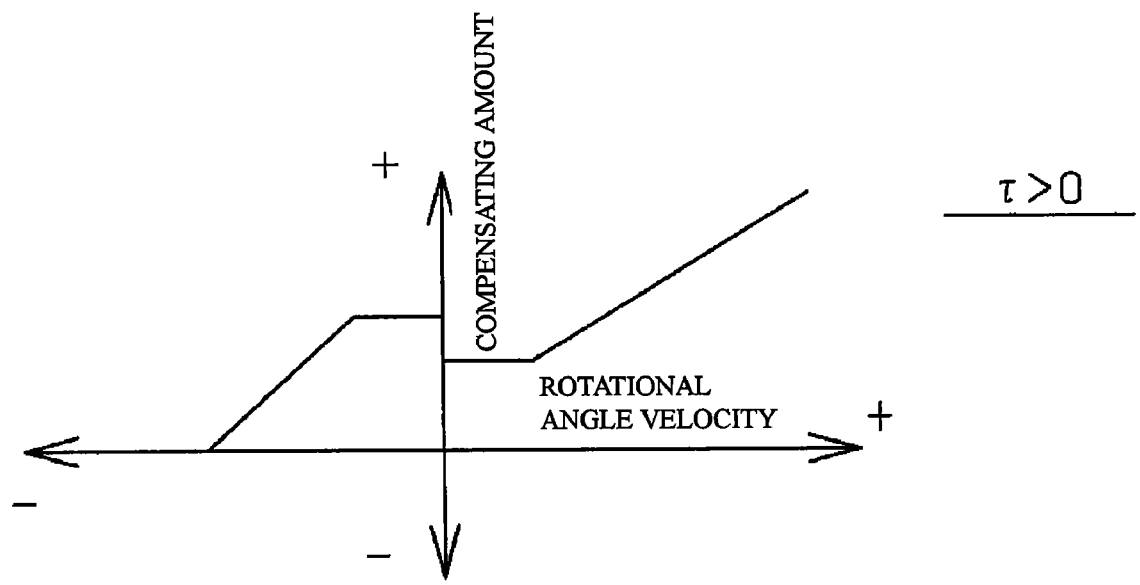
FIGS. 21a, 21b are a diagram showing the relation between the compensating amount and the rotational angle velocity at each steering direction according to another embodiment of the present invention.
Figure 21B:
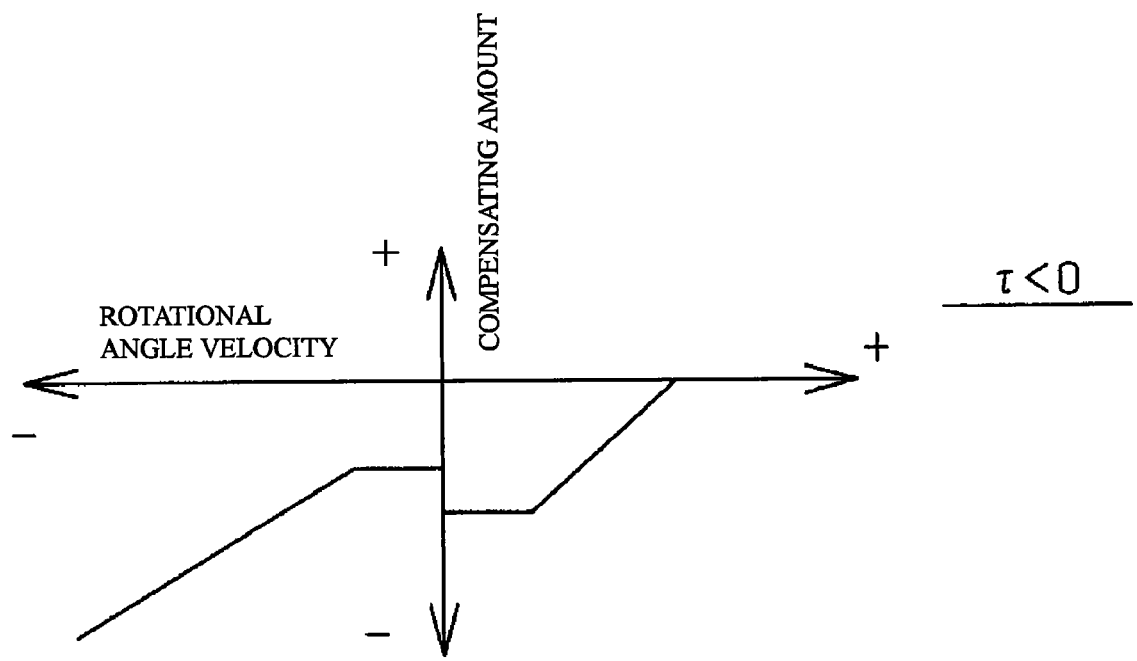

As shown in FIG. 20, however, the rotational angle θ of the motor 12 in the one embodiment can pass the rush position of the rotational angle θa (θp0) into the reducing range with the faster rotational angle velocity ω than the rush velocity ωin at the reverse rotation by the way of assisting the reverse rotation by exerting the reversal assisting force. The rotational angle θ of the motor 12 is backed to a rotational angle θp2 positioned far from the rush position and again rotated to the steering direction. In this moment, the steering system is in torsion by the reverse rotation to the back direction so that the absolute value of the steering torque t detected by the torque sensor 14 is large. The motor 12 is accelerated by the large assisting force calculated based on the large steering torque τ to get the faster rush velocity ωin than the previous rush velocity, that is to say the rush velocity ωin possible to reach a rotational angle θp3 positioned in the advanced direction far from the rotational angle θp1 where is the maximum reaching position at previous rushing.

Where the rush velocity ωin is below the critical velocity ωcr, that is the rotational angle θp3 as the maximum reaching position is within the reducing range, it is repeated these reverse operation and the exertion of the reversal assisting to get the faster rush velocity ωin than the critical velocity ωcr, passing the reducing range.

While the invention has been described in detail with reference to the preferred embodiment, it will be apparent to those skilled in the art that the invention is not limited to the present embodiment, and that the invention may be realized in various other embodiments within the scope of the claims, for example:

A. In the one embodiment of the present invention, the present invention is applied for the electric power steering apparatus (EPS), however, the invention may be applied for other motor control apparatus than the electric power steering apparatus.

B. In the one embodiment of the present invention, the ECU 11 as the motor controller has three control modes of "the normal control mode", "the assist stopping mode" and "the two phases mode". However the state of the motor control at the abnormal generation is not limited to these three modes. The state of the motor control may be any mode to execute the motor control of the two phases of the current-carrying other than the phase generated the current-carrying failure at the generation of the current-carrying failure. And also, the method of the judging of the abnormal detecting is not limit the construction of the one embodiment.

C. The current command value calculating section 23 of the one embodiment output the phase current command value about one phase from the two phases other than the phase generated the current-carrying failure at the two phases driving and the motor control signal generating section 24 calculates the phase voltage command value about said one phase and after this calculation it calculates the phase voltage command value about other phase. However, the present invention is not limited to this method, the current command calculating section 23 may be constructed to output both two phases other than the phase generated the current-carrying failure.

D. In the one embodiment the micro computer 17 calculates the phase current command value Iv* of the V phase at the abnormal state of the U phase or the W phase based on the equations (1) to (3) and the phase current command value Iu* of the U phase at the abnormal state of the V phase. But the present invention may be constructed to calculates the phase current command value Iw* of the W phase at the abnormal state of the U phase or the V phase and the phase current command value Iu* of the U phase at the abnormal state of the W phase and so on. In this state each of the phase current command values can be calculated the reversed mark of the equations (1) to (3).

E. The phase current command value at the generation of the current-carrying failure may not coincide perfectly to the results calculated by the equations (1) to (3). That is to say, it may make the same effect to calculate the phase current command value as changing in almost secant curve or almost cosecant curve at making the predetermined rotational angle as the asymptote or as changing in approximation of the secant curve or the cosecant curve. However, the one embodiment generates the motor current being nearly equaled to the demand torque by calculating the phase current command value based on the equations (1) to (3), therefore the nearer the result calculated based on these equation is to the phase command value, the more valuable effect is made.

F. In the one embodiment the base compensating amount ϵ1 based on the mark of the steering torque τ, that is the steering direction, is constant where the steering direction coincides with the rotational direction of the motor 12 and where it does not coincide with the rotational direction of the motor 12 referred to FIG. 12, FIG. 18a, FIG. 18b. The base compensating amount ε1 may be changed where the steering direction coincides and where it does not coincide. For example, where the steering direction does not coincide with the rotational direction of the motor 12, the base compensating amount ε1 should be increased more than in the coincidence.

Figure 22A:
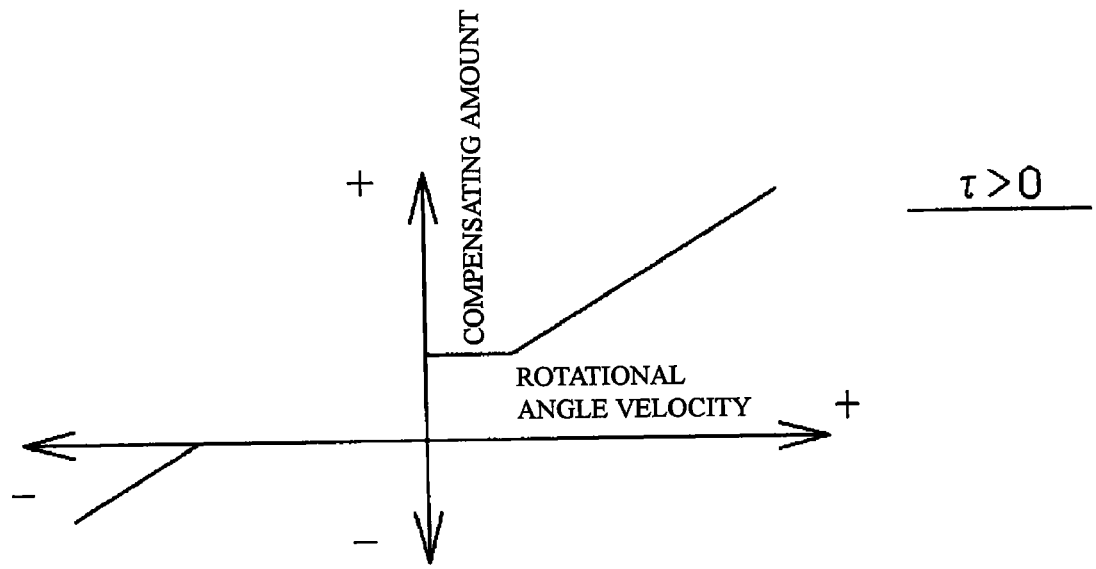
FIGS. 22a, 22b are a diagram showing the relation between the compensating amount and the rotational angle velocity at each steering direction according to still another embodiment of the present invention.
Figure 22B:
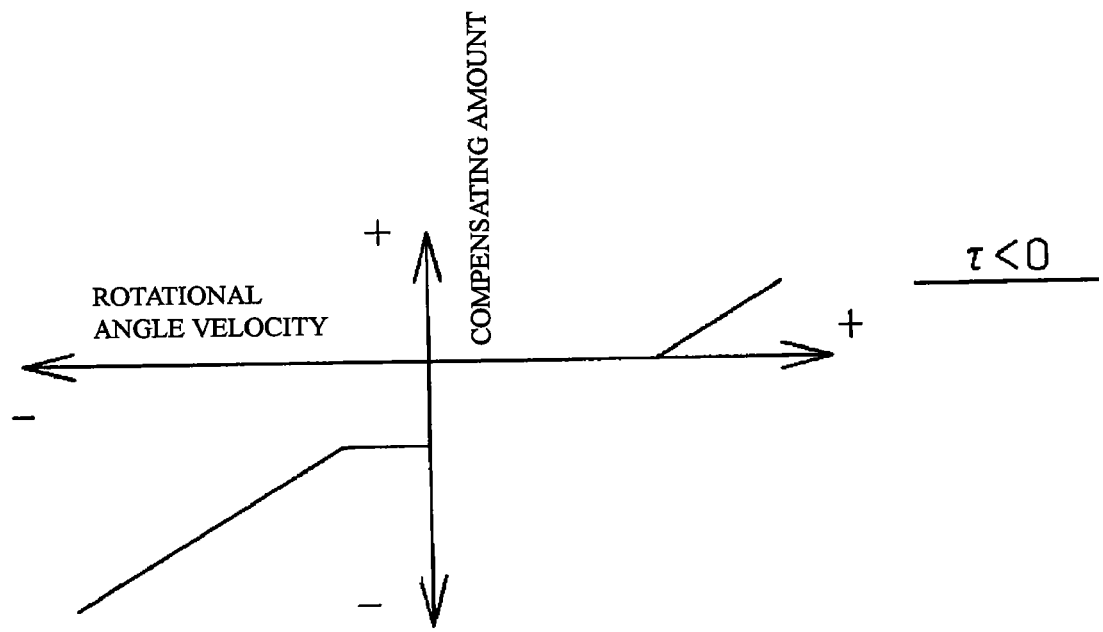
Figure 23A:
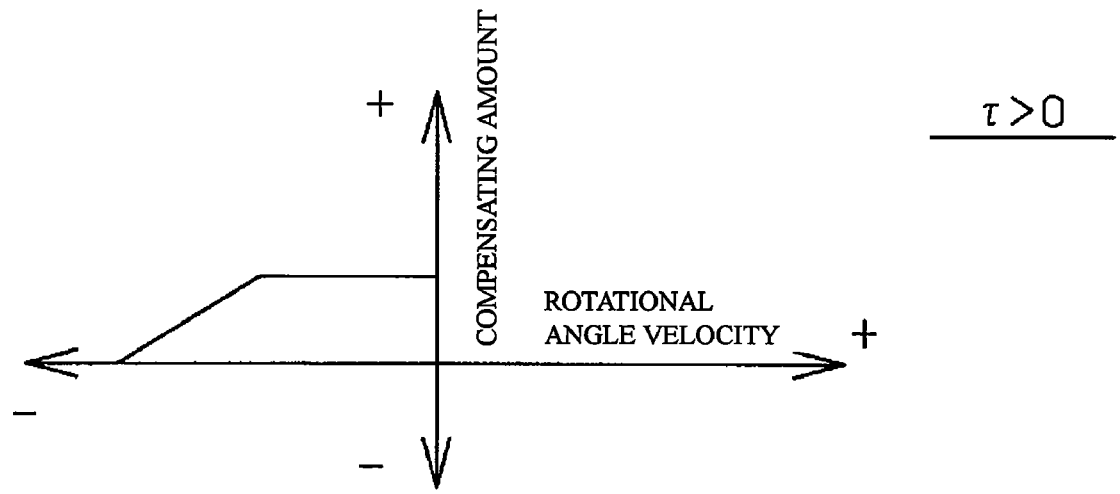
FIGS. 23a, 23b are a diagram showing the relation between the compensating amount and the rotational angle velocity at each steering direction according to further another embodiment of the present invention.
Figure 23B:
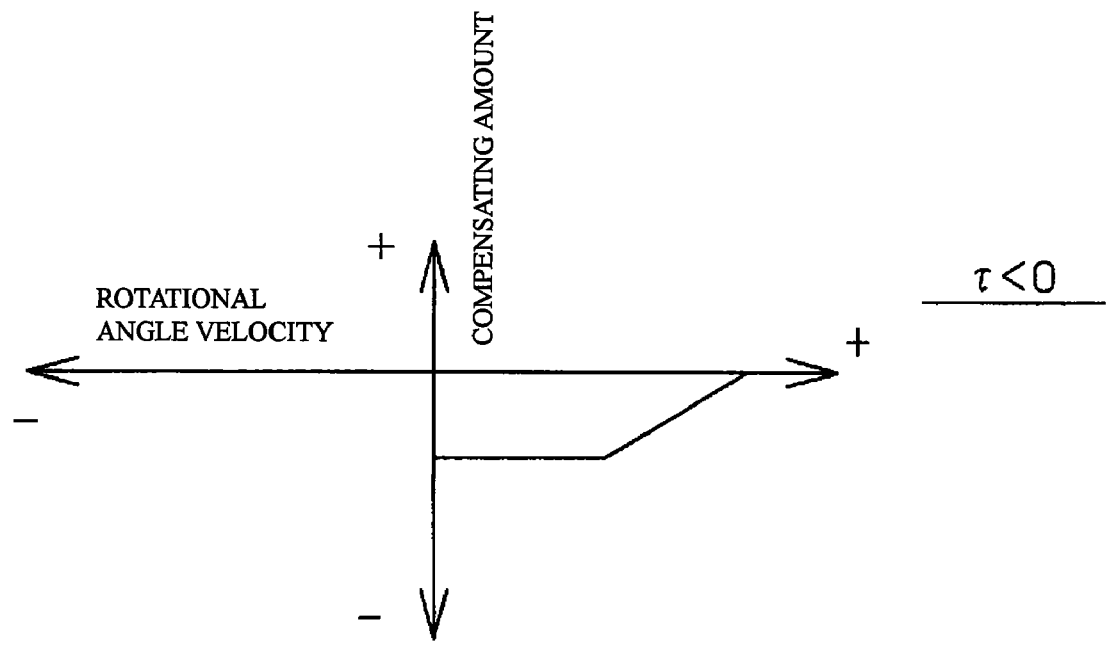

G. In the one embodiment where the rush velocity ωin is faster than the critical velocity ωcr to pass the reducing range adjacent to the predetermined rotational angle θA, θB at changing point of the direction of the phase current and where the steering direction coincides with the rotational direction of the motor, the rotational angle θ is compensated to the advanced direction so that the generation of the reversal assisting is restrained to achieve the smooth rotation. And in the one embodiment where the rotational angle velocity ω is below the critical velocity ωcr and where the steering direction does not coincide with the rotational direction of the motor, the rotational angle θ is compensated to the delay direction to transform the reversal assisting force to the rotational angle velocity ω so that the rush velocity ωin is faster than the critical velocity ωcr to restrain the generation of the sticking. However the present invention is not limited to this construction, but may be constructed to compensate only the rotational angle to the advanced direction where the steering direction coincides with the rotational direction of the motor as shown in FIG. 22a, FIG. 22b, or may be constructed to compensate only the rotational angle to the delay direction where the steering direction does not coincide with the rotational direction of the motor as shown in FIG. 23a, FIG. 23b.

H. The current control my not be limited to the phase current feedback control in the three phases alternating current coordinate U, V, W. For example, it may calculate the d-axis current command value Id* changeable as a tangent curve at making the predetermined rotational angle A, B as the asymptote in accordance with the phase generated the current-carrying failure based on next equations (6) to (8). In current-carrying failure of U phase;

$$I_d^* = I_q^* \frac{\sin\theta}{\cos\theta} = I_q^* \tan\theta \quad (6)$$

In current-carrying failure of V phase;

$$I_d^* = -I_q^* \frac{\sin\left(\theta + \frac{\pi}{3}\right)}{\sin\left(\theta - \frac{\pi}{6}\right)} = I_q^* \tan\left(\theta - \frac{2\pi}{3}\right) \quad (7)$$

In current-carrying failure of V phase:

$$I_d^* = -I_q^* \frac{\sin\left(\theta + \frac{2\pi}{3}\right)}{\sin\left(\theta + \frac{\pi}{6}\right)} = I_q^* \tan\left(\theta + \frac{2\pi}{3}\right) \quad (8)$$

Figure 24:
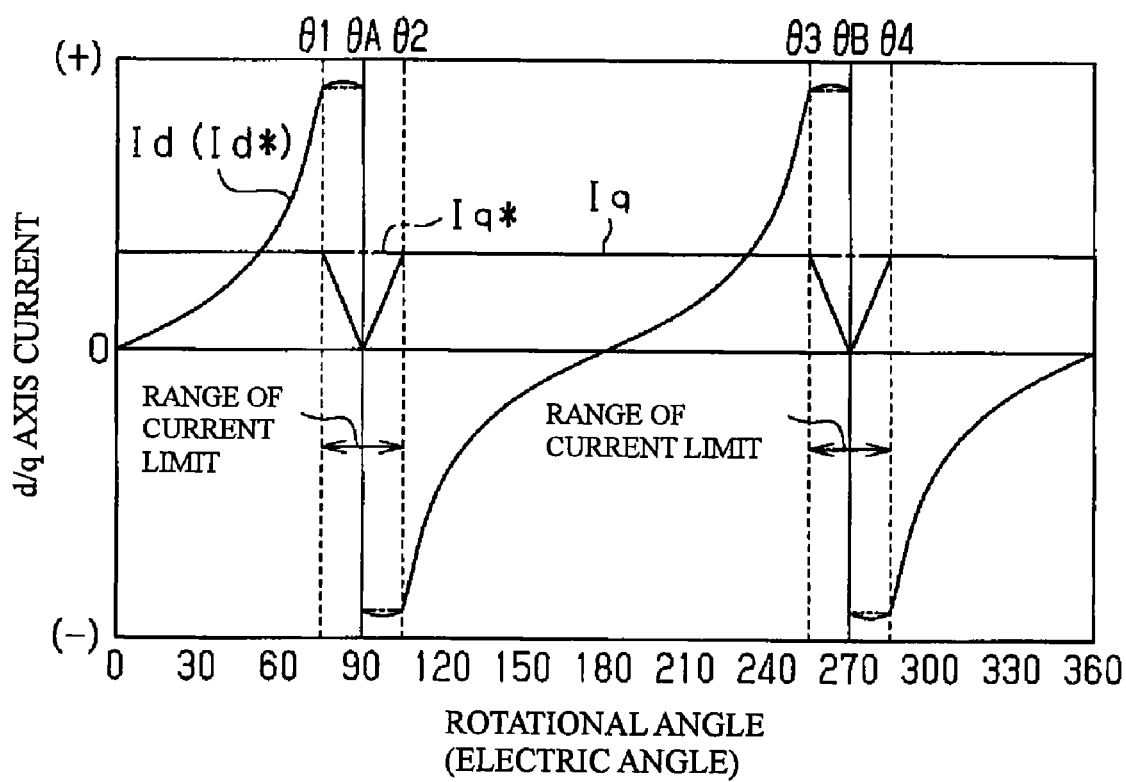
FIG. 24 is an explanatory diagram showing the transition of the d-axis current and q-axis current at the two phases driving where the U phase is in the current-carrying failure according to further another embodiment of the present invention.

And the motor control signal may be calculated by the execution of the current feedback control of the d/q coordinate system based on the d-axis current command value Id* referred to FIG. 24. FIG. 24 shows where the U phase is the current-carrying failure. It may be applied to output the motor control signal by executing an open-loop control other than the feedback control.

I. In the one embodiment the base compensating amount calculating section 41 judges the rotational direction of the motor 12 based on the mark of the steering torque τ. However the present invention is not limited to this construction, but the judgment of the rotational direction of the motor may be achieved based on the rotational angle velocity ω, the current command value, actual current value or assisting control amount and so on.

J. In the one embodiment the rotational angle compensating control section 40 includes the base compensating amount calculating section 41 calculating the base compensating amount ε1 to compensate the rotational angle θ in the advanced direction and the rotational angle velocity compensating amount calculating section 42 calculating the rotational angle velocity compensating amount ε2 in accordance with the rotational angle velocity ω. However the present invention is not limited to this construction, but it may be constructed to compensate the rotational angle θ according to the rotational direction of the motor 12 or to compensate the rotational angle θ according to the rotational angle velocity ω only.

What is claimed is:

1. A motor controller comprising a motor control signal output member outputting a motor control signal, a driving circuit supplying three phases driving power to a motor based on said motor control signal, and an abnormal detecting member detecting a current-carrying failure generated in any phases of said motor, wherein;
   said motor control signal output member generates said motor control signal by executing a current control based on a rotational angle of said motor, and executes an output of said motor control signal to carry a current in other remaining two phases than a phase generated said current-carrying failure at a generation of said current-carrying failure; and
   said motor control signal output member executes said current control to carry to each of said two phases a phase current changing in accordance with a secant curve or a cosecant curve with making a predetermined rotational angle according to said phase generated said current-carrying failure as an asymptote at said generation of said current-carrying failure, and compensates said rotational angle to correct a phase offset between a current command value and an actual current value in said current control.

2. A motor controller according to claim 1, wherein said motor control signal output member compensates said rotational angle in an advanced direction in accordance with a rotational direction of said motor.

3. A motor controller according to claim 2, wherein said motor control signal output member compensates said rotational angle in a way that the faster a rotational angle velocity of said motor is, the larger a compensating amount of said rotational angle in said advanced direction is.

4. A motor controller according to claim 3, wherein said current control at said generation of said current-carrying failure is a current feedback control.

5. A motor controller according to claim 4, wherein said motor control signal output member executes said current feedback control in a d/q coordinate system without said generation of said current-carrying failure, and a phase current feedback control at said generation of said current-carrying failure.

6. A motor controller comprising;
   a motor control signal output means outputting a motor control signal;

a driving circuit supplying three phases driving power to a motor based on said motor control signal; and an abnormal detecting means detecting a current-carrying failure generated in any phases of said motor, wherein;

said motor control signal output means generates said motor control signal by executing a current control based on a rotational angle of said motor, and executes an output of said motor control signal to carry a current in other remaining two phases than a phase generated said current-carrying failure at a generation of said current-carrying failure; and said motor control signal output means further executes said current control to carry to each of said two phases a phase current changing like a secant curve or a cosecant curve at making a predetermined rotational angle according to said phase generated said current-carrying failure as an asymptote at said generation of said current-carrying failure, and compensates said rotational angle in advanced direction in accordance with a rotational direction of said motor in a way that the faster a rotational angle velocity of said motor is, the larger a compensating amount of said rotational angle in said advanced direction is, to correct a phase offset between a current command value and an actual current value in said current control.

* * * * *